(12) United States Patent
Ikeda et al.

(10) Patent No.: US 7,817,210 B2
(45) Date of Patent: Oct. 19, 2010

(54) IMAGE PROCESSING METHOD, IMAGE DISPLAY APPARATUS, AND TELEVISION APPARATUS

(75) Inventors: Takeshi Ikeda, Ebina (JP); Osamu Sagano, Inagi (JP); Naoto Abe, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1512 days.

(21) Appl. No.: 11/168,288

(22) Filed: Jun. 29, 2005

(65) Prior Publication Data

US 2006/0001910 A1 Jan. 5, 2006

(30) Foreign Application Priority Data

Jun. 30, 2004 (JP) ............................. 2004-194270
Feb. 17, 2005 (JP) ............................. 2005-039993
Jun. 21, 2005 (JP) ............................. 2005-180493

(51) Int. Cl.
*H04N 5/202* (2006.01)
(52) U.S. Cl. ...................................... 348/671
(58) Field of Classification Search ............... 348/671, 348/674, 675, 676, 677, 254–256; 345/601, 345/602, 63, 89; 358/519; 382/169
See application file for complete search history.

(56) References Cited

U.S. PATENT DOCUMENTS

| | | | | |
|---|---|---|---|---|
| 4,979,136 A * | 12/1990 | Weiman et al. | ............. | 382/169 |
| 5,196,924 A * | 3/1993 | Lumelsky et al. | ........... | 348/674 |
| 5,282,036 A * | 1/1994 | Worley et al. | ............... | 348/674 |
| 5,585,846 A * | 12/1996 | Kim | ............................. | 348/254 |
| 6,166,781 A * | 12/2000 | Kwak et al. | .................. | 348/674 |
| 6,278,496 B1 * | 8/2001 | Kitagawa et al. | ............ | 348/674 |
| 6,570,611 B1 * | 5/2003 | Satou et al. | .................. | 348/189 |
| 6,597,371 B2 * | 7/2003 | Mandl | ......................... | 345/691 |
| 6,833,876 B1 * | 12/2004 | Pirjaberi | ..................... | 348/674 |
| 6,873,308 B2 | 3/2005 | Sagano et al. | .............. | 345/75.2 |
| 6,900,747 B2 * | 5/2005 | Lee | ............................. | 341/106 |
| 6,924,843 B1 | 8/2005 | Yamazaki et al. | ......... | 348/423.1 |
| 7,057,667 B1 | 6/2006 | Mori et al. | ................... | 348/554 |
| 7,190,396 B2 * | 3/2007 | Sasaki | ......................... | 348/254 |
| 7,345,713 B2 * | 3/2008 | Arai et al. | .................... | 348/687 |
| 7,612,831 B2 * | 11/2009 | Miyasaka | ................... | 348/674 |

(Continued)

FOREIGN PATENT DOCUMENTS

JP         2001-211349         8/2001

(Continued)

*Primary Examiner*—Paulos M Natnael
(74) *Attorney, Agent, or Firm*—Fitzpatrick, Cella, Harper & Scinto

(57) ABSTRACT

An image processing method comprising: reading out corrected data from a memory which prestored the corrected data, by referring to low P bit (P is an integer number $\geq 1$, and $\leq$ to M) in M bits digital image data (M is an integer number $\geq$ to 2); calculating corrected data based on data for operation read out from the memory which prestored the data, wherein the data is read out by referring to high R bit (R is an integer number $\geq 1$, and $\leq M-1$) in the digital image data; and outputting the read-out corrected data in a case that a value of the digital image data is not greater than a predetermined value, and outputting the calculated corrected data in a case that the value is greater than the predetermined value.

9 Claims, 14 Drawing Sheets

U.S. PATENT DOCUMENTS

| | | | |
|---|---|---|---|
| 2001/0050777 A1 | 12/2001 | Gobert | 358/1.9 |
| 2003/0107542 A1 | 6/2003 | Abe et al. | 345/89 |
| 2004/0027479 A1 | 2/2004 | Ikeda | 348/363 |
| 2004/0257386 A1 | 12/2004 | Sagano et al. | 345/690 |
| 2005/0001827 A1 | 1/2005 | Abe et al. | 345/204 |
| 2005/0018916 A1* | 1/2005 | Kondo | 382/238 |
| 2005/0156869 A1 | 7/2005 | Mori et al. | 345/104 |
| 2006/0001910 A1 | 1/2006 | Ikeda et al. | 358/3.22 |
| 2006/0062433 A1 | 3/2006 | Ikeda | 382/107 |

FOREIGN PATENT DOCUMENTS

| | | |
|---|---|---|
| JP | 2003-241707 | 8/2003 |

* cited by examiner

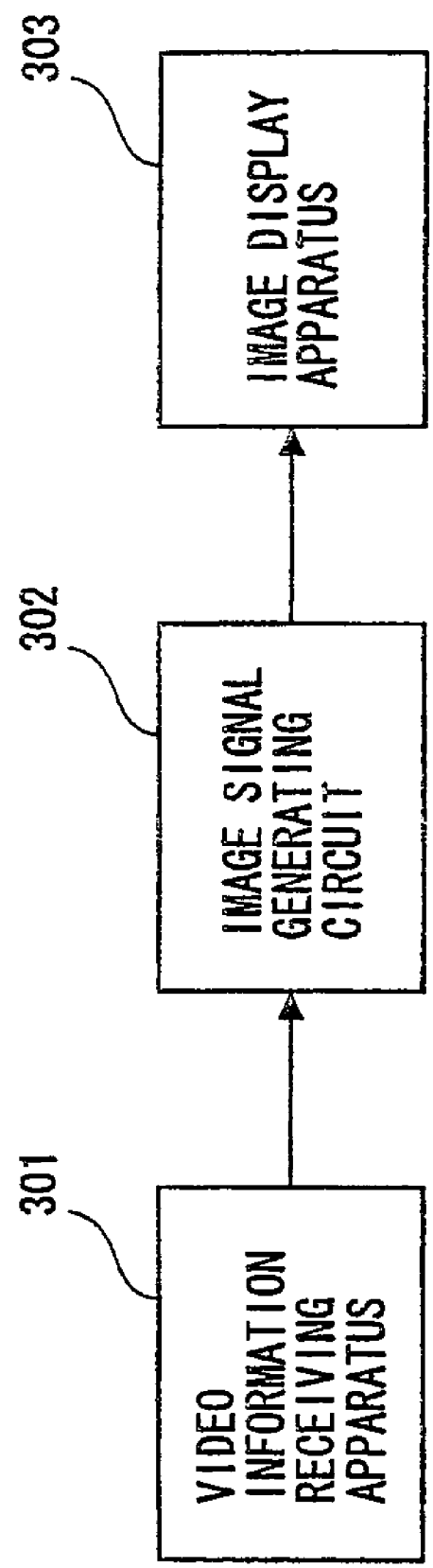

IMAGE PROCESSING METHOD, IMAGE DISPLAY APPARATUS, AND TELEVISION APPARATUS

BACKGROUND OF THE INVENTION

1. Field of the Invention

The invention relates to an image processing method, an image display apparatus, and a television apparatus. More specifically, the invention relates to techniques well suited for adaptation to an image processing method for image display apparatuses such as a television receiver and a display apparatus that use a display device including matrix-wired multiple electron-emitting devices, thereby to receive a television signal or a display signal from a computer or the like and to display an image.

2. Related Background Art

Known conventional image display apparatuses include that of the type including n×m electron-emitting devices matrix-arrayed by being wired to m row lines and n column lines, and phosphors that correspond to each electron-emitting device and that emit light in response to the incidence of electrons emitted from the electron-emitting devices. Example of the phosphor includes phosphor.

In addition, it is known that the emission luminance of the phosphors is not in a linear relationship with the amount of electron beams irradiated on the phosphors, but is prone to saturation.

Japanese Patent Application Laid-Open No. 2003-241707 (corresponding U.S. patent application Publication No. 20030107542A1) discloses a correction table for canceling the saturation characteristic of the phosphors provided to correct the saturation characteristic.

Japanese Patent Application Laid-Open No. 2001-211349 (corresponding U.S. patent application Publication No. 20010050777A1) discloses that table input values excluding low-order bits of input values are input into a memory to prevent a significantly large storage space from being required.

SUMMARY OF THE INVENTION

However, in a configuration disclosed in Japanese Patent Application Laid-Open No. 2003-241707, in the event of correcting image data with low gradation, when the amount of correction information in the correction table is deficient, a case can occur where the balance of the amount of light emission of the phosphors is disrupted due to the influence of quantization error. This can potentially cause a case where the image quality, particularly, white balance, is disrupted. In addition, when the amount of the correction information in the correction table is increased to improve the image quality, although the image data can be corrected with high accuracy, a case can occur where the memory size being used as the correction table is increased and the hardware scale is increased.

In addition, according to the configuration disclosed in the Japanese Patent Application Laid-Open No. 2001-211349, since also the data with low gradation in the input image data is interpolated, there is a problem of image quality deterioration. Further, since a determination is made whether image data being input has low luminance or high luminance thereby to perform address translation in order to look up the corrected data, there is a problem that the hardware configuration is intricate.

In view of the above, an object of the invention is to provide a display apparatus and a television apparatus that are each capable of displaying high quality images.

According to a first aspect of the invention, there is provided an image processing method comprising: a step of reading out corrected data from a memory which prestored the corrected data, by referring to low P bit (P is an integer number greater than or equal to 1, and less than or equal to M) in M bits digital image data (M is an integer number greater than or equal to 2);

a step of calculating corrected data based on data for operation read out from the memory which prestored the data for operation, wherein the data for operation is read out from the memory by referring to high R bit (R is an integer number greater than or equal to 1, and less than or equal to M−1) in the digital image data; and a step of outputting the read-out corrected data in case that a value of the digital image data is not greater than a predetermined value, and outputting the calculated corrected data in case that the value of the digital image data is greater than the predetermined value.

Also, it is desirable to obtain the calculated corrected data by executing interpolation calculation based on the read-out data for operation.

BRIEF DESCRIPTION OF THE DRAWINGS

FIG. 10 is a block diagram showing a television apparatus according to a fourth embodiment of the invention;

DETAILED DESCRIPTION OF THE PREFERRED EMBODIMENTS

Figure 1:
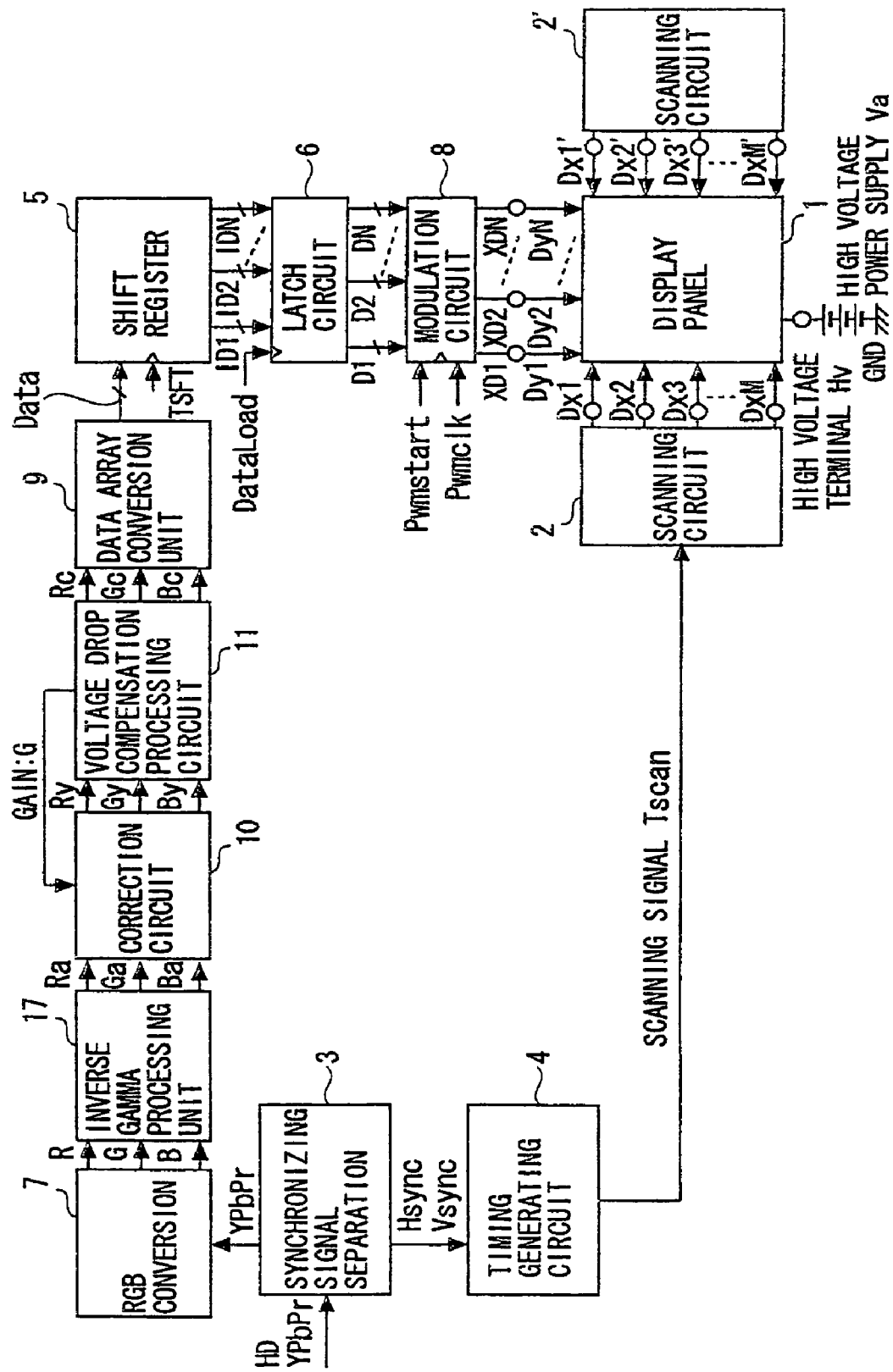
FIG. 1 is a block diagram showing an image display apparatus incorporating a correction processing circuit according to a first embodiment of the invention.

The preferred embodiments of the present invention will be described below with reference to the drawings. In all the drawings, the same portions or portions corresponding to one another are identified by the same reference numerals. Unless otherwise specifically mentioned, the scope of the invention is not intended to be limited only to the dimensions, materials, shapes, and relative locations, and so forth of components described in the embodiments.

The invention can be adapted to self-emitting displays of the type that has phosphor and drives the phosphor to emit light to form images. Displays of this type include, but are not limited to, field emission displays, plasma displays, and organic EL displays. The following describes a configuration, specifically, a configuration using surface conduction electron-emitting devices, with reference to a field emission display by way of example.

According to an embodiment of the invention, an image display apparatus includes a display device. In the display device, multiple surface conduction electron-emitting devices are disposed at cross points on a passive matrix by using multiple scan lines and multiple modulation lines. The display device thus formed can be called a "display panel." The display panel has a phosphor that emits light in response to irradiation of electron beams emitted from the electron-emitting devices. The image display apparatus additionally includes a driver circuit that can drive the display panel to display images in accordance with TV (television) signals. As such, preferred image display can be implemented by assembling a correction processing circuit according to the invention into the image display apparatus.

First Embodiment

An image display apparatus according to a first embodiment includes a correction processing circuit including a correction table for correcting for display characteristics of each of R, G, and B colors, that is, light emission characteristics.

In the first embodiment, the correction processing circuit and a voltage drop correction processing circuit are assembled into the image display apparatus, thereby to enable the configuration of the image display apparatus that optimally corrects for the saturation of the phosphor to perform preferred image display. The voltage drop correction processing circuit is provided between the correction processing circuit and the display panel, that is, in a backstage of the correction processing circuit.

(Functions of Overall System and Individual Portions Thereof)

The following will describe a hardware configuration of the image display apparatus on which the correction processing circuit and the voltage drop correction processing circuit according to the first embodiment of the invention are mounted.

The exterior of the display panel of the image display apparatus according to the first embodiment, electrical connections relative to the passive matrix structure, and the characteristics of the surface conduction electron-emitting devices are similar to those conventionally known, so that detailed descriptions thereof are omitted herefrom. In the image display apparatus according to the first embodiment, line-sequential driving is performed, and image display is performed by a pulse-width modulating unit.

(Hardware Configuration)

To begin with, the hardware configuration according to the first embodiment will be described hereinbelow. FIG. 1 shows a circuit configuration of the image display apparatus according to the first embodiment.

As shown in FIG. 1, in the image display apparatus according to the first embodiment, scanning circuits 2 and 2' are connected from two sides to a display panel 1. In the display panel 1, there are provided voltage supply terminals Dx1 to DxM and Dx1' to DxM' of scan lines, voltage supply terminals Dy1 to DyN of modulation lines of the display panel 1, and a high voltage supply terminal Hv for applying accelerating voltage between a face plate and a rear plate. A high voltage power supply Va is connected to the high voltage supply terminal Hv. Electron emission elements are arranged so that scanning wiring and modulating wiring are connected on the surface of the rear plate side of the face plate, respectively (not shown). In the surface of the rear plate side of the face plate, an anode electrode, potential of which is supplied by the high voltage supply terminal Hv, and a luminous body that emits light to which the electron emitted from the electron emission element collides are laminated (not shown). For example, in order to display a color image on the display panel, the luminous bodies of red, green, and blue are arranged. Each of the luminous bodies for red, green, and blue is called a pixel. The digital image data of the invention represent the data including brightness information corresponding to each pixel.

A synchronizing signal separation circuit 3 and a timing generating circuit 4 for supplying a scanning signal Tscan are connected to the scanning circuits 2 and 2'.

The signal output from the synchronizing signal separation circuit 3 is supplied to an RGB conversion circuit 7. The RGB conversion circuit 7 that converts a luminance & color difference signal (YPbPr signal) to a three-primary-color signals (RGB signals) outputs the RGB signals. The output RGB signals are supplied to an inverse gamma processing unit 17, undergoes inverse gamma processing, and is then supplied to a data array conversion unit 9. A data signal is output from the data array conversion unit 9 and is supplied to a shift register 5. The shift register 5 is configured to be able to output image data ID1 to IDN corresponding to the number of modulation lines.

The image data ID1 to IDN are supplied to a latch circuit 6. Image data D1 to DN, which are output from the latch circuit 6 and also correspond to the number of modulation lines, are supplied to a pulse-width modulating circuit 8. Image data XD1 to XDN are output from the pulse-width modulating circuit 8.

The individual image data output from the scanning circuits 2 and 2' and the individual image data output from the pulse-width modulating circuit 8 are supplied to the scan lines and modulation lines in the display panel 1.

In the image display apparatus according to the first embodiment, there are provided a correction processing circuit 10, and a voltage drop correction processing circuit 11, according to the present invention; the shift register 5 corresponding to one line of image data; the latch circuit 6 corresponding to one line of image data; and the pulse-width modulating circuit 8 that outputs modulation signals to modulation lines of the display panel 1.

In FIG. 1, R, G, and B individually represent RGB-parallel input image data; and Ra, Ga, and Ba individually represent RGB-parallel image data having undergone later-mentioned inverse gamma conversion processing. In addition, in FIG. 1, Ry, Gy, and By individually represent RGB-parallel corrected image data corrected by the correction processing circuit 10 in consideration of the saturation of the phosphors; and Rc, Gc, and Bc individually represent RGB-parallel image data corrected by the voltage drop correction processing circuit 11 to eliminate the influence of the voltage drop. Further, in FIG. 1, Data represents image data parallel/serial-converted by the data array conversion unit 9.

The input video signal is first separated by the synchronizing signal separation circuit 3 in FIG. 1 into synchronous signals Vsync and Hsync, and these signals are supplied to the timing generating circuit 4. The video signal separated into synchronous signals is supplied to the RGB conversion unit. In the interior of the RGB conversion unit, there are provided, for example, a lowpass filter (not shown) and an A/D converter (not shown) in addition to a conversion circuit performing the conversion from YPbPr to RGB. YPbPr is converted by the RGB conversion circuit 7 to digital RGB signals, and the RGB signals are supplied to the inverse gamma processing unit 17.

The timing generating circuit 4 generates timing signals corresponding to various image formats and generates operation timing signals for each section. Timing signals to be generated by the timing generating circuit 4 include, but are not limited to, a signal Tsft for controlling the operation timing of the shift register 5, a control signal Dataload for latching data from the shift register 5 into the latch circuit 6, a pulse width modulation (PWM) start signal Pwmstart for the pulse-width modulating circuit 8, a clock Pwmclk for PWM; and a signal Tscan for controlling the operation of the scanning circuit 2.

The scanning circuits 2, 2' output a selection potential Vs or a non-selection potential Vns to the connection terminals Dx1 to DxM to sequentially scan the display panel 1 by one line during one horizontal scan time interval.

The scanning circuits 2, 2' perform scanning by sequentially changing a scan line being selected every one horizontal time interval in synchronism with the timing signal Tscan being supplied from the timing generating circuit 4. The Tscan is a group of timing signals created from, for example, the vertical synchronous signal and horizontal synchronous signal.

(Inverse Gamma Processing Unit)

The inverse gamma processing unit 17 shown in FIG. 1 will be described here. Generally, taking CRT characteristics into account, an input video signal is pre-converted in accordance with a 0.45-power gamma characteristic.

However, when modulation is applied in accordance with an application time of a driving voltage, the display panel 1 of the image display apparatus according to the first embodiment of the invention has substantially linear light emission characteristics with respect to the application time. Accordingly, in the inverse gamma processing unit 17, the input video signal is converted in such a manner as to cancel the 0.45-power gamma characteristic (which hereafter will be referred to as "inverse gamma conversion").

(Correction Processing Circuit)

The correction processing circuit 10 to which the invention is applied will now be described hereafter. The correction processing circuit 10 corrects for the saturation characteristics of the phosphors. A correction method used in the correction processing circuit 10 is conventionally known as the method described in detail in Japanese Patent Application Laid-Open No. 2003-241707, so that description thereof is omitted herefrom. In the correction processing circuit 10, the arithmetic operation is performed in accordance with the gain G calculated by the voltage drop correction processing circuit 11. Thereby, the saturation characteristic of the phosphors can be optimally corrected.

According to the first aspect of the invention, there is provided an image processing apparatus comprising: a first memory from which prestored T bits corrected data (T is an integer number greater than or equal to 2) is read out by referring to digital image data; a first arithmetic circuit that calculates data based on the corrected data readout from the first memory; a second memory from which prestored U bit data for operation (U is an integer number greater than or equal to 1, and less than or equal to T–1) is read out by referring to the digital image data; a second arithmetic circuit that calculates data based on the data for operation read out from the second memory; and a selector circuit that outputs the data calculated by the first arithmetic circuit in case that a value of the digital image data is less than or equal to a predetermined value and that outputs the data calculated by the second arithmetic circuit in case that the value of the digital image data is greater than the predetermined value.

In addition, the T bits corrected data is correction data whose data width is T bits. Similarly, the U bit data for operation of is data for operation whose data width is U bit.

Also, this is the same in the second embodiment mentioned later.

Figure 2:
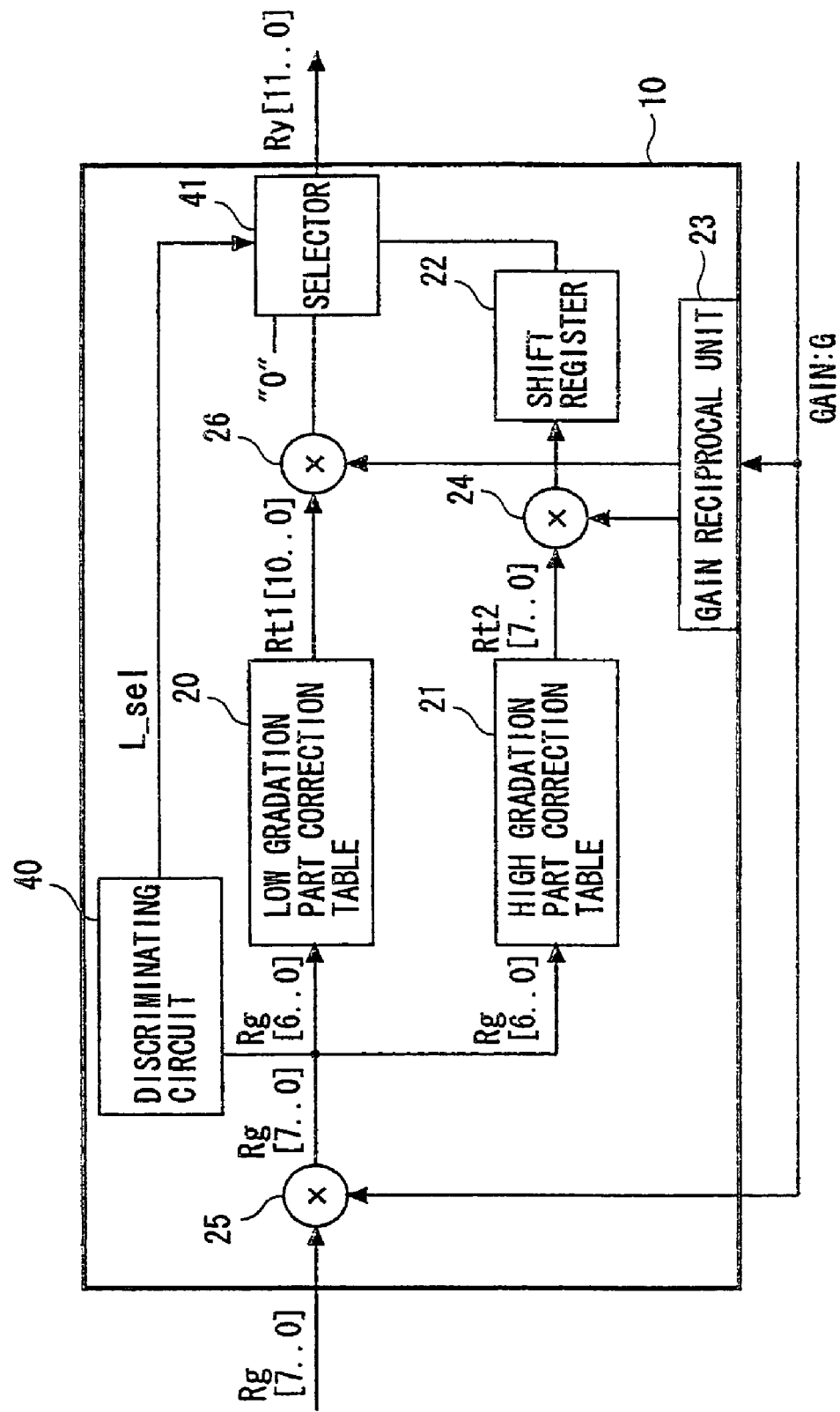
FIG. 2 is a block diagram showing the correction processing circuit according to the first embodiment of the invention.

FIG. 2 shows the correction processing circuit according to the first embodiment of the invention. To simplify description, signals only on R (red) are shown in FIG. 2.

As shown in FIG. 2, the correction processing circuit 10 according to the first embodiment is configured to include a low gradation part correction table 20 and a high gradation part correction table 21. A first memory according to the invention is configured to include the low gradation part correction table 20, and a second memory according to the invention is configured to include the high gradation part correction table 21. The correction processing circuit 10 further includes a shift register 22, a gain reciprocal unit 23, multipliers 24 to 26, a discriminating circuit 40, and a selector 41. A first arithmetic circuit according to the invention is configured of the multiplier 26, and a second arithmetic circuit is configured of the multiplier 24 and the shift register 22. A selector circuit according to the invention is configured of the selector 41.

Input signals and output signals are each indicated with a signal name and a data width. For example, in the case of a signal represented as "Ra[7 . . . 0]", it is indicated that the name of the signal is "Ra", the least significant bit of the signal is 0, the most significant bit of the signal is 7, and the data width of the signal is eight bits.

The low gradation part correction table 20 includes a first correction information group for correcting a first range on a low gradation side of a gradation range allocatable to the input image data. The high gradation part correction table 21 includes a second correction information group for correcting a second range on a high gradation side of the gradation range allocatable to the input image data. In the first embodiment, a gradation range allocatable to the input image data is divided in half. In the input image data of 8 bits, 0 to 127 are allocated to the first range and 128 to 255 are allocated to the second range.

To begin with, an input image data Ra of 8 bits according to the first embodiment is input into the correction processing circuit 10. Then the input image data Ra is multiplied by the gain in a multiplier 25. An input image data Rg of 7 bits excluding 1 most-significant bit after the gain multiplication is input into the low gradation part correction table 20. Then, correction processing is performed referring to the first correction information group so that a low-gradation-part output image data Rt1 of 11 bits is output. Specifically, the digital image data of 7 bits is referred to, and prestored corrected data of 11 bits is thereby read out from the first memory. In the input image data Rg in the low gradation part, the data of the 1 most-significant bit is '0'. As such, the 1 most significant bit is excluded, thereby to configure the data width of the input data to the low gradation part correction table 20 to have 7 bits in order to reduce the memory amount. According to this configuration, image quality deterioration can be restrained, and the memory size can be reduced.

Although the low-gradation-part output image data Rt1 is 11-bit data, the data represents information equivalent to information of 12 bits. In the first embodiment, whereas the low gradation part correction table 20 is configured to produce the output at a data width of 12 bits, the 1 most-significant bit of the low-gradation-part output image data Rt1 is '0'. As such, the 1 most-significant bit is excluded, thereby to configure the table data width to have 10 bits in order to reduce the memory amount. According to this configuration, image quality deterioration can be restrained, and the memory size can be reduced.

Then, the low-gradation-part output image data Rt1 is multiplied by the reciprocal of the gain. That is, data is calculated in the first arithmetic circuit based on the corrected data read out from the first memory. Thereafter, the low-gradation-part output image data Rt1 multiplied by the reciprocal of the gain is input into the selector 41.

The input image data Rg of 7 bits excluding 1 most-significant bit after the gain multiplication is input into the high gradation part correction table 21. Then, correction processing is performed referring to the second correction information group so that a high-gradation-part output image data Rt2 of 7 bits is output. Specifically, the digital image data of 7 bits is referred to, and prestored data for operation of 8 bits is thereby read out from the second memory. In the input image data Rg in the high gradation part, the data of the 1 most-significant bit is '1'. As such, the 1 most-significant bit is excluded, thereby to configure the data width of the input data to the high gradation part correction table 21 to have 7 bits in order to reduce the memory amount. According to this configuration, image quality deterioration can be restrained, and the memory size can be reduced.

Then, the high-gradation-part output image data Rt2 is multiplied by the reciprocal of the gain. The data obtained by being multiplied by the reciprocal of the gain further undergoes processing by the shift register 22 to be shifted to 12 bits, and the data is then input into the selector 41. That is, data is calculated in the second arithmetic circuit based on the data for operation read out from the second memory.

In addition, it is determined by the discriminating circuit 40 whether the input image data Rg after the gain multiplication is low gradation data or high gradation data. A result L_sel is input into the selector 41.

In the selector 41 in case that the input image data Rg is the low gradation data, then low-gradation-part correction image data is output as correction image data Rv. In this event, since the low-gradation-part correction image data is 11-bit data, '0' is added to the most significant bit, thereby to produce an output of 12 bits. On the other hand, in case that the input image data Rg is the high gradation data, then the high-gradation-part correction image data is output as correction image data Rv. More specifically, in case that the value of the input 8-bit digital image data is less than or equal to a predetermined value, then the data calculated by the first arithmetic circuit is output; and in case that the value of the input 8-bit digital image data is greater than the predetermined value, then the data calculated by the second arithmetic circuit is output. In the first embodiment, the predetermined value is the maximum value of the low 7 bits, excluding the most significant bit, of the input image data Rg, and the value is 127. In this manner, the output data Rv of the correction processing circuit 10 is created and output to the voltage drop correction processing circuit 11.

Figure 3A:
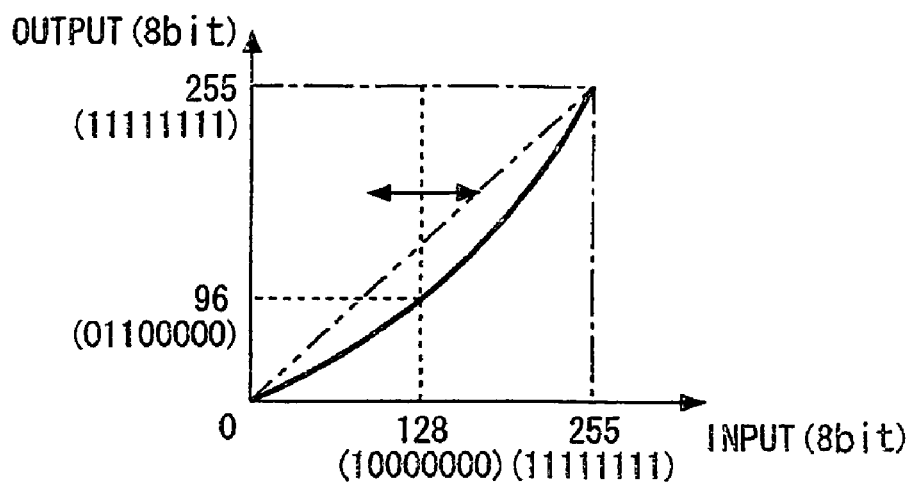
FIGS. 3A to 3C are each a graph showing a correction table mounted in the correction processing circuit according to the first embodiment of the invention.
Figure 3B:
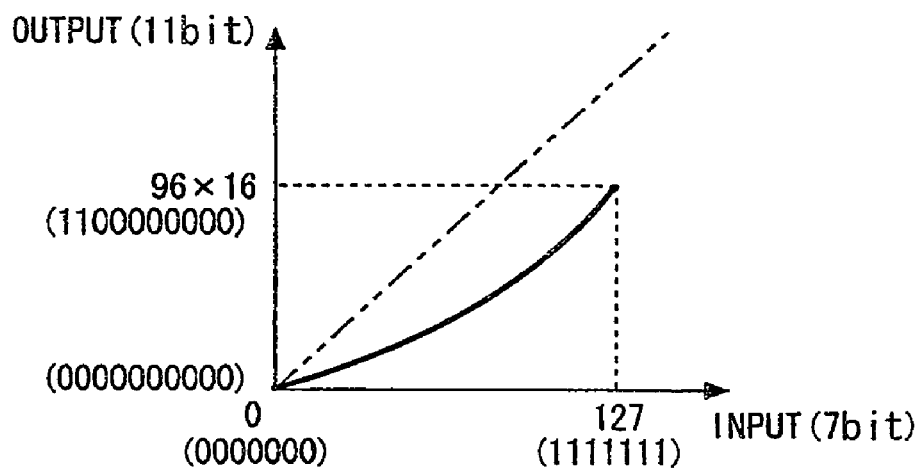
Figure 3C:
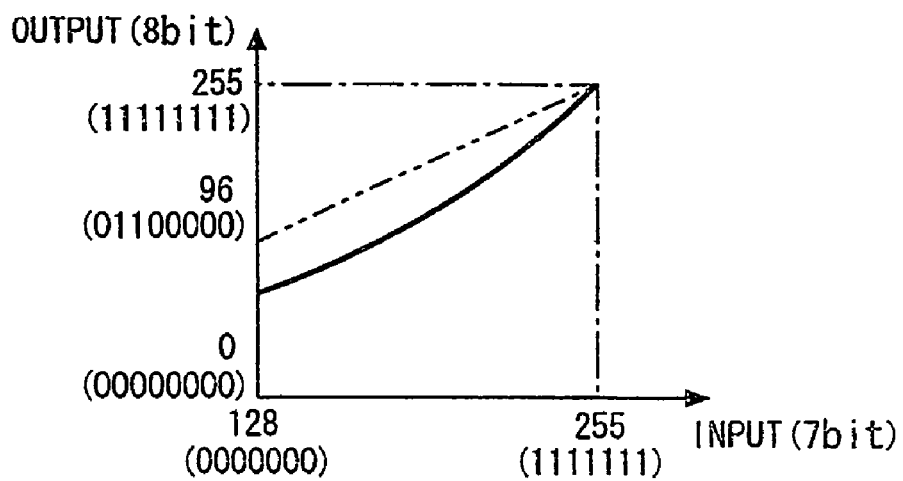

The correction tables will now be described hereafter. FIG. 3A shows correction information regarding the correction tables for performing a saturation correction of a conventional phosphor. FIGS. 3B and 3C show correction information regarding the correction tables according to the first embodiment. Shown in FIG. 3A is correction information in the case where the correction processing is performed for 8-bit input image data to 8-bit output image data. Digits in parentheses are values in the case of binary representation. In comparison, according to the first embodiment, the correction processing of the first range of the gradation range allocatable to the input image data is performed by the low gradation part correction table 20, and the correction processing of the second range on the higher gradation side than the first range is performed by using the high gradation part correction table 21.

Shown in FIG. 3B is correction-table-related correction information prestored in the low gradation part correction table 20. The low gradation part correction table 20 contains the first correction information group for the correction of the first range (0 to 127) of the gradation range allocatable to the input image data, and 11-bit output image data is output after the correction processing.

On the other hand, the high gradation part correction table 21 has correction-table-related correction information shown in FIG. 3C. The high gradation part correction table 21 contains the second correction information group for the correction of the second range (128 to 255) in the gradation range allocatable to the input image data.

The data amount of the low gradation part correction table 20 is the product (1408 (bits)) of the number of items of referred digital image data (128 (items)) and the data width (11 bits) of corrected data that is to be read out from the low gradation part correction table 20.

The data amount of the high gradation part correction table 21 is the product (1024 (bits)) of the number of items of referred digital image data (128 (items)) and the data width (8 bits) of data for operation that is to be read out from the high gradation part correction table 21.

Thus, according to the first embodiment, the sum (2432 (bits)) of the data amount (1408 bits) of the corrected data stored in the first memory and the data amount (1024 bits) of the data for operation stored in the second memory is less than the product (3072 (bits)) of 28 and the bit width (12 bits) of selected and output corrected data.

According to this configuration, while image quality deterioration is being restrained, the scale of hardware such as memories can be reduced.

The correction tables in the correction processing circuit, respectively, include the first correction information group corresponding to the first range of the gradation range allocatable to the image data being input, and the second correction information group corresponding to the second range existing on the higher gradation side than the first range. Further, in the configuration, the amount of correction information corresponding to a range included in the second range and having the same width as a predetermined width is less than the amount of correction information corresponding to a range included in the first range and having the predetermined width. The memory amount can be reduced even in this configuration.

The amount of correction information corresponding to the range having the predetermined width is the value of the product of a number of items of input data and a data width of data, wherein the number of the items is the number of items of input data inputtable into the correction table in a value of image data included in a range having a predetermined width, and the data width is the data width of data output from the correction table corresponding to one item of input data.

The amount of correction information in the low gradation part correction table 20 is the product (1408 (bits)) of bit width (11 bits) and the number ($2^7$), wherein the bit width (11 bits) is the width of the data output from the low gradation part correction table 20 corresponding to one item of input data, and the number ($2^7$) is the number of items of input data inputtable into the low gradation part correction table 20 in the value of image data included in the range having the predetermined width (128 (items)).

The amount of correction information in the high gradation part correction table 21 is the product (1024 (bits)) of the bit width (8 bits) and the number ($2^7$), wherein the bit width (8 bits) is the width of the data output from the high gradation part correction table 21 in correspondence to one item of input data, and the number ($2^7$) is the number of items of input data inputtable into the high gradation part correction table 21 in the value of image data included in the range having the predetermined width (128 (items)).

As described above, in the low gradation part correction table 20, the correction information corresponding to the range included in the first range and having the predetermined range width is not reduced, thereby to enable quantization error to be reduced. On the other hand, in the high gradation part where the quantization error is not prominent, the correction information corresponding to the range having the predetermined range width is made less than that in the low gradation part. Thereby, the correction processing circuit 10 with less quantization error can be realized without increasing the scale of hardware such as memories.

According to the first embodiment, similar to the case of R, for G, B phosphor saturation correction table as well, the processing is independently performed in the first range and the second range, thereby to enable the correction processing circuit 10 with less quantization error to be realized without increasing the scale of hardware such as memories.

Similarly as in the R case, Gv, Bv is generated as the output of the correction processing circuit 10 and is output to the voltage drop correction processing circuit 11. The light emission characteristics of the phosphor vary depending on, for example, the phosphor type, electron beam density, electron beam irradiation time, and accelerating voltages applied between the face plate and rear plate. As such, the contents of descriptions in the individual correction table used in the correction processing circuit 10 according to the first embodiment are not limited to the above described.

(Voltage Drop Compensation Processing Circuit)

Figure 4:
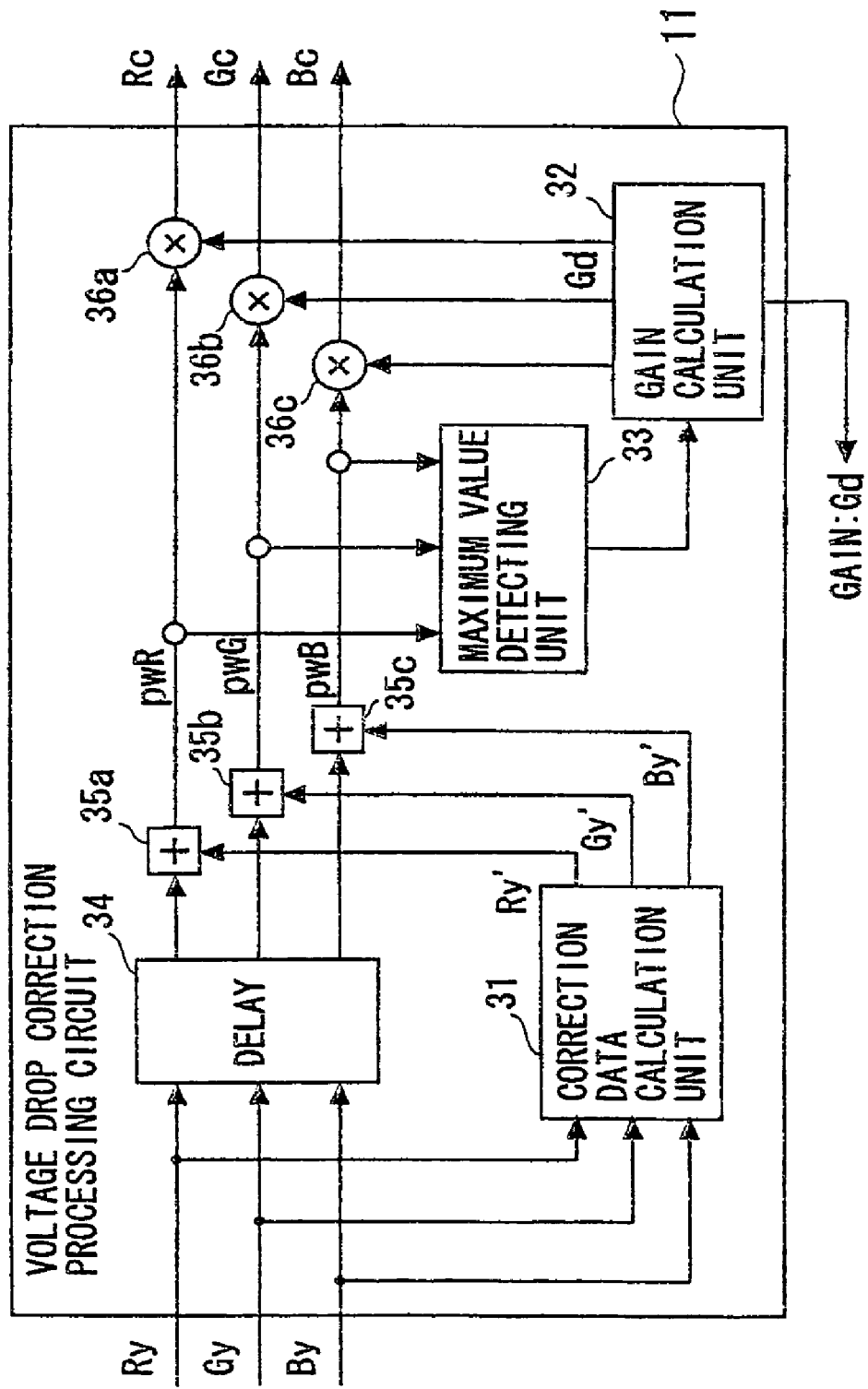
FIG. 4 is a block diagram showing a voltage drop correction processing circuit mounted in the correction processing circuit according to the first embodiment of the invention.

The voltage drop correction processing circuit 11 will now be described hereafter. FIG. 4 shows the voltage drop correction processing circuit 11 according to the first embodiment.

Referring to FIG. 4, the voltage drop correction processing circuit 11 includes a correction data calculation unit 31, a gain calculation unit 32, a maximum detecting unit 33 that detects a maximum value from among correction image data, and a delay circuit 34 that provides delays so that corrected data from the correction data calculation unit 31 corresponding to the image data are properly added. The voltage drop correction processing circuit 11 further includes adders 35a to 35c that, respectively, add output data Rv', Gv', and Bv' from the correction data calculation unit 31 to input image data Rv, Gv, and Bv; and multipliers 36a to 36c that, respectively, multiply the image data to which the corrected data from the correction data calculation unit 31 are added, by gains Gd being output from the gain calculation unit 32.

Figure 5:
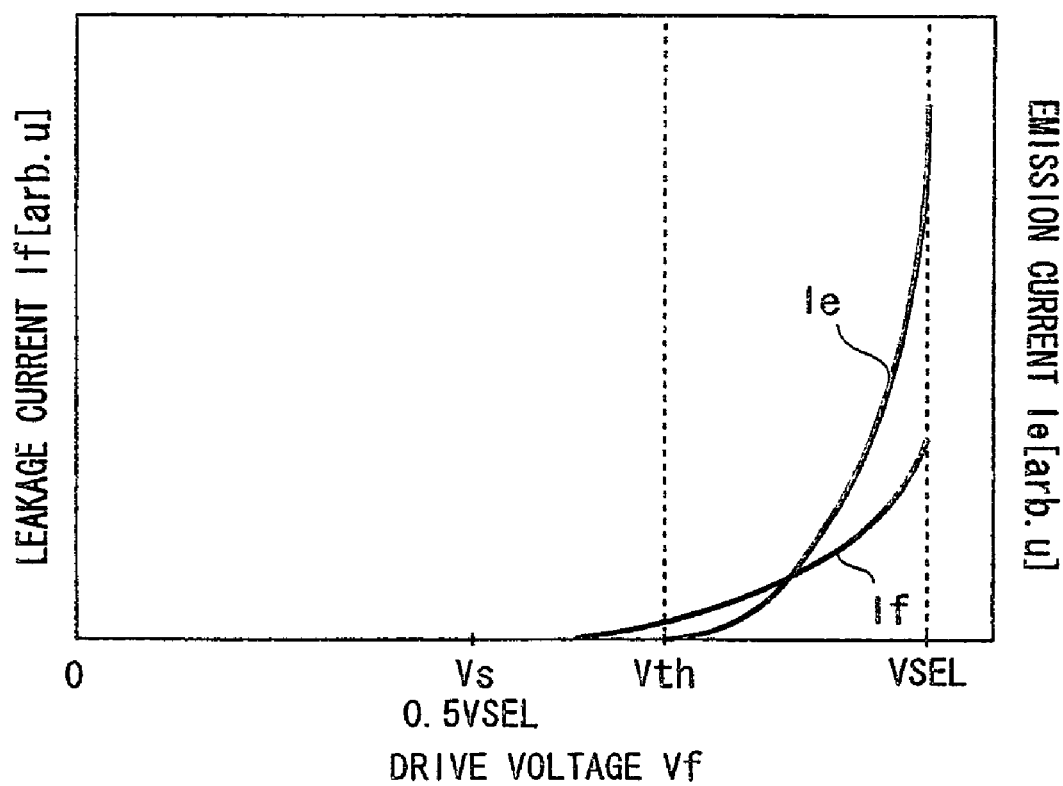
FIG. 5 is a graph showing characteristics of a surface conduction electron-emitting device adaptable to the invention.

An outline of voltage drop correction will be briefly described here. To begin with, the processing measures an amount of a voltage drop due to wiring resistance of scan lines with respect to input image data. Then the processing calculates a reduction amount of emission current due to the influence of the voltage drop from a graph Vf-Ie of FIG. 5 (STEP 1 of FIG. 6A). Since it is conventionally known, a detailed description of the correction data calculation method in the correction data calculation unit 31 is omitted herefrom. Then, as shown at STEP 2 of FIG. 6B, the reduction amount of the emission current is compensated for by increasing the pulse width.

Figure 6A:
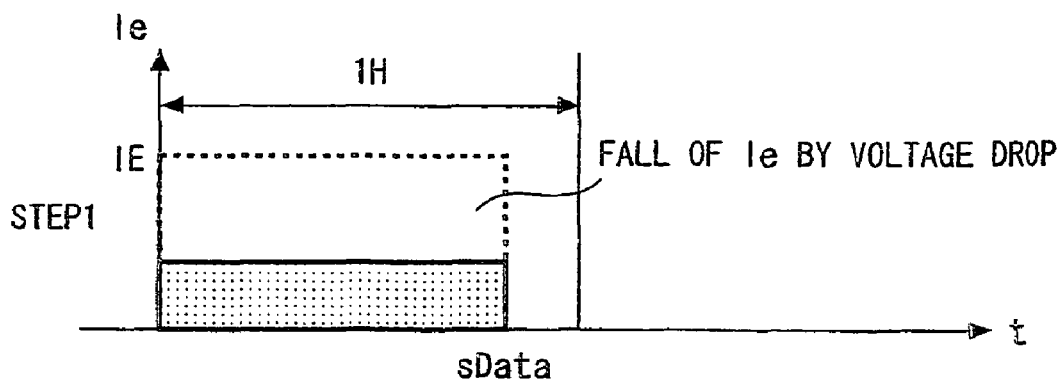
FIGS. 6A to 6C are schematic diagrams descriptive of correction method in accordance with the voltage drop correction method.
Figure 6B:
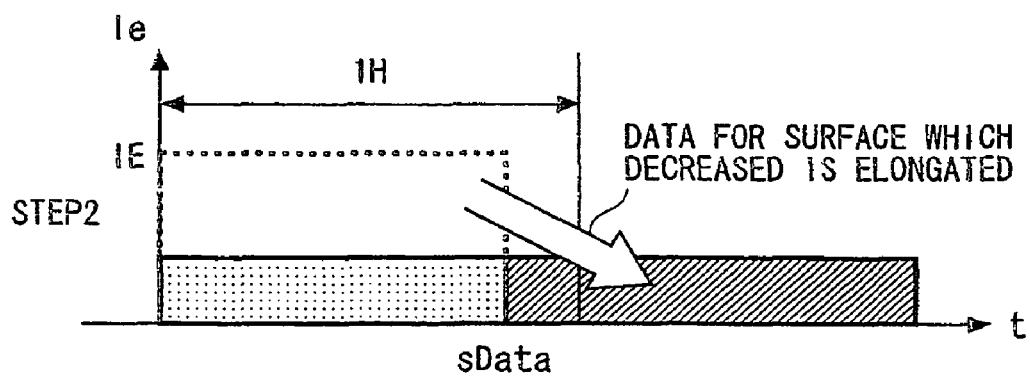
Figure 6C:
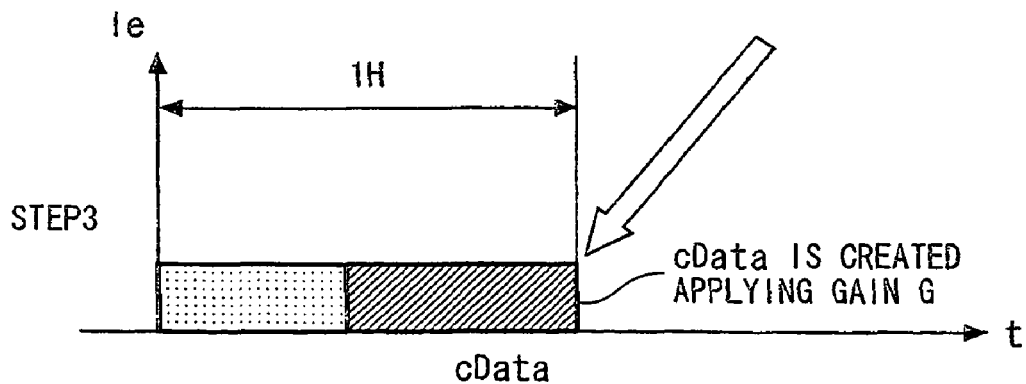

FIGS. 6A to 6C briefly show electron emission characteristics of the surface conduction electron-emitting device. The vertical axes of the FIGS. 6A, 6B, 6C represent the current emission from the electron-emitting device, while horizontal axes represent the pulse width (time axis). According to the first embodiment, in the voltage drop correction processing circuit 11, the charge amount necessary to obtain a predetermined luminance (brightness) is compensated for by pulse elongation. Elongated amounts of pulse width data take the form of outputs pwR, pwG, and pwB from the correction data calculation unit 31.

However, as shown in STEP 2 of FIG. 6B, when the pulse is elongated, a case can occur where one horizontal scan time interval is exceeded, thereby causing overflowing data. As such, a maximum value of image data after addition of one-frame correction data is detected by the maximum detecting unit 33, and a gain Gd such as to cause the maximum value of the image data to fall within one horizontal time interval is calculated by the gain calculation unit 32. Then, the gain Gd is applied to all the image data, thereby to prevent overflow of the image data. The gain Gd is then transferred to the correction processing circuit 10 to be used in the arithmetic operation for correction processing of a subsequent frame.

In accordance with the above-described steps, image data Rc, Gc, and Bc after the voltage drop correction output from the voltage drop correction processing circuit 11, and are supplied to the data array conversion unit 9.

The data array conversion unit 9 shown in FIG. 1 has the function of re-arraying the image data Rc, Gc, and Bc, which are video signals, in correspondence to a pixel array of the display panel. The video signals Rc, Gc, and Bc having been parallel input into the data array conversion unit 9 are serial output as image data "Data" to the shift register 5. Although detailed description is omitted, the operation is performed in accordance with a timing control signal being output from the timing generating circuit 4.

The image data "Data" having been output from the data array conversion unit 9 is converted from the serial data format to parallel image data ID1 to IDN individually corresponding to modulation lines by the shift resister 5. The converted image data are then output to the latch circuit 6. In the latch circuit 6, the data from the shift register 5 is latched immediately before the start of one horizontal interval in accordance with the timing signal Dataload. Outputs from the latch circuit 6 are supplied as parallel image data D1 to DN to the pulse-width modulating circuit 8.

The pulse-width modulating circuit 8 (PWM circuit) serving as a modulation unit includes a pulse-width modulating counter (PWM counter), and a comparator and switch (FET in FIG. 1) in units of the modulation line. The relationship between the image data D1 to DN and the output pulse widths from the modulation unit is linear. In the first embodiment, the bit width of the image data D1 to DN being supplied to the pulse-width modulating circuit 8 is assumed to be 12 bits.

Using the above-described configuration according to the first embodiment, the inventors observed images displayed with the correction processing circuit 10 being mounted. As a consequence, it was verified that preferred images can be displayed while concurrently achieving preferred image quality, particularly, white balance, by restraining the occurrence of quantization error in the low gradation part. In addition, it was verified that increase in the scale of hardware such as memories can be restrained. Further, it was verified that preferred images can be displayed even in the event of moving-picture display.

Second Embodiment

Figure 7:
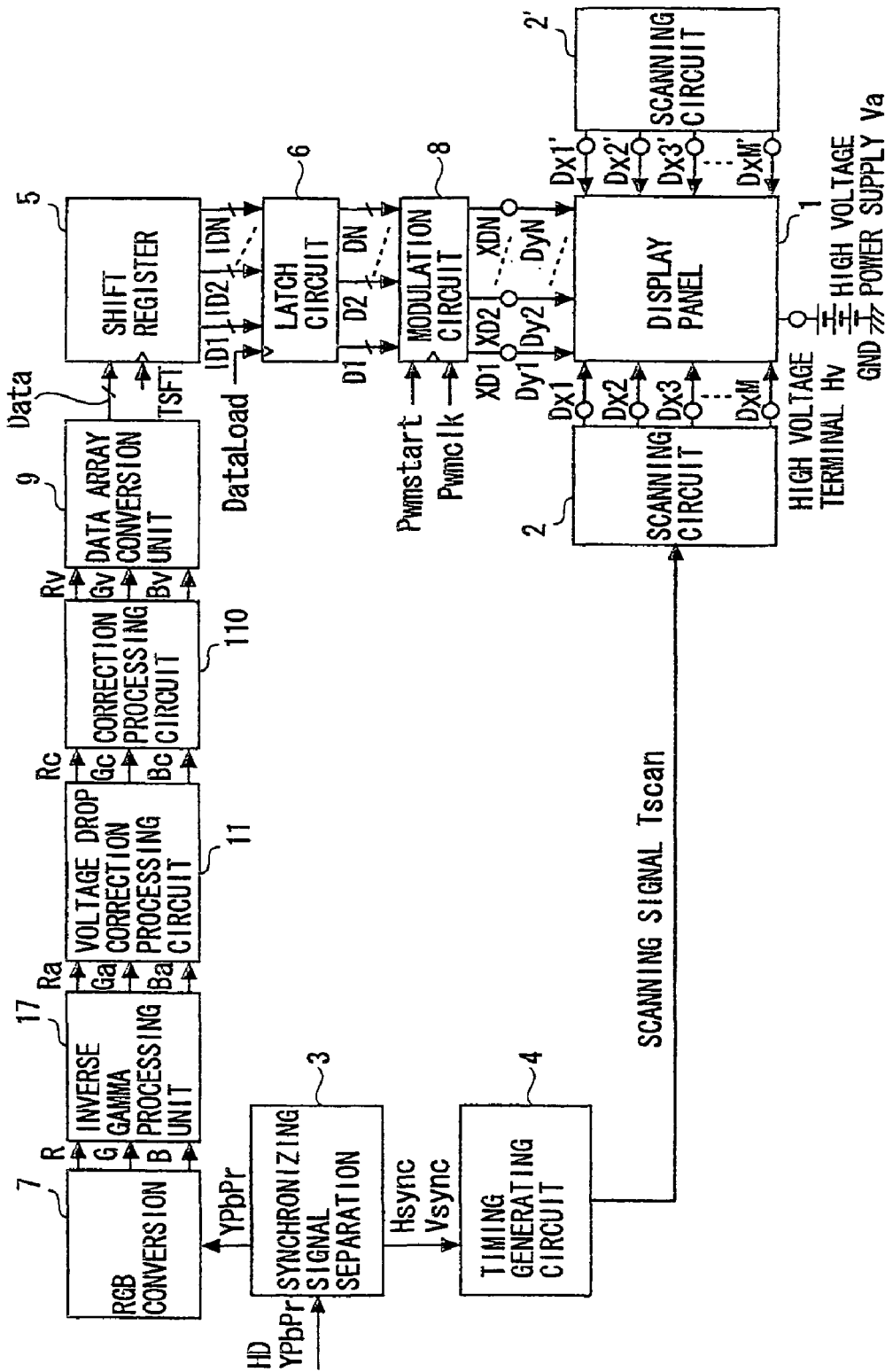
FIG. 7 is a block diagram showing an image display apparatus incorporating a correction processing circuit according to a second embodiment of the invention.

An image display apparatus according to a second embodiment of the invention will be described hereafter. FIG. 7 shows the hardware configuration of the image display apparatus according to the second embodiment. In the display apparatus according to the second embodiment, the configuration of a correction processing circuit 110 is different from that in the display apparatus according to the first embodiment. The correction processing circuit 110 is provided in the display apparatus according to the second embodiment. A further difference from the display apparatus according to the first embodiment is that the voltage drop correction processing circuit 11, which compensates for the voltage drop amount in the display panel 1, is built in a forestage of the correction processing circuit 110. Other portions of the configuration are common to the configuration of the display apparatus according to the first embodiment, so repeated descriptions thereof will be omitted herefrom.

Figure 8:
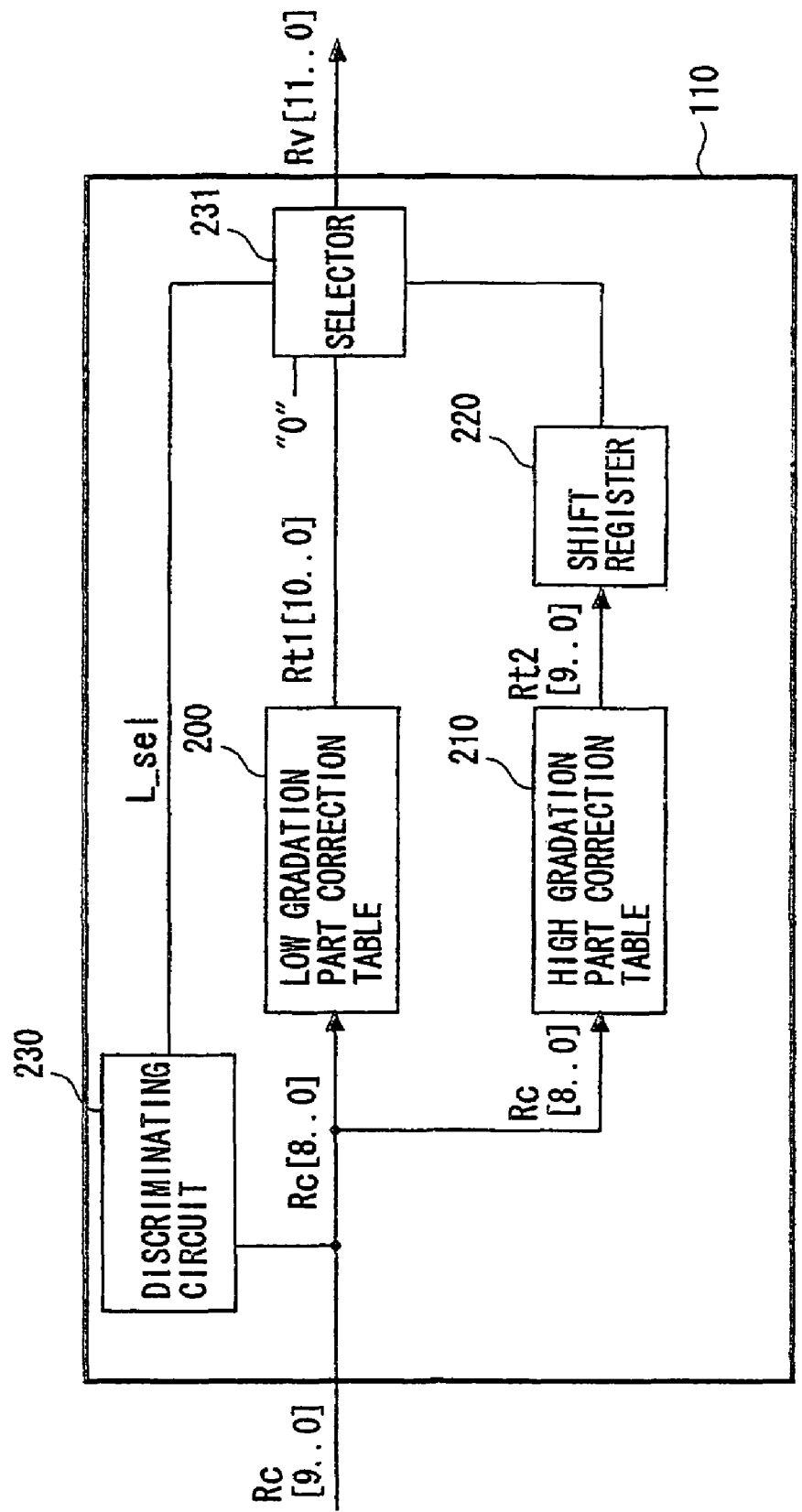
FIG. 8 is a block diagram showing the correction processing circuit according to the second embodiment of the invention.

According to the second aspect of the invention, there is provided an image processing apparatus comprising: a first memory from which prestored T bits corrected data (T is an integer number greater than or equal to 2) is read out by referring to digital image data; a second memory from which prestored U bit data for operation (U is an integer number greater than or equal to 1, and less than or equal to T−1) is read out by referring to the digital image data; an arithmetic circuit that calculates corrected data based on the data for operation read out from the second memory; and a selecting circuit that outputs the read-out corrected data in case that a value of the digital image data is less than or equal to a predetermined value and that outputs the calculated corrected data in case that the value of the digital image data is greater than the predetermined value. FIG. 8 shows the configuration of the correction processing circuit 110 according to the second embodiment. For simplifying description, signals only on R (red) are shown in the correction processing circuit 110 of FIG. 8. The correction processing circuit 110 according to the second embodiment is configured to include a low gradation part correction table 200, a high gradation part correction table 210, a shift register 220, a discriminating circuit 230, and a selector 231. A first memory according to the invention is configured to include the low gradation part correction table 200, and a second memory according to the invention is configured to include the high gradation part correction table 210. An arithmetic circuit according to the invention is configured of the shift register 220. A selector circuit according to the invention is configured of the selector 231.

In the second embodiment, an input image data Rc of 10 bits is input into the correction processing circuit 110. In the second embodiment, the gradation range allocatable to the input image data is divided in half. In the input image data of 10 bits, 0 to 511 are allocated to a first range, and 512 to 1023 are allocated to a second range.

To begin with, the input image data Rc of 9 bits excluding 1 most significant bit is input into the low gradation part correction table 200. Then, correction processing is performed referring to a first correction information group so that a low-gradation-part output image data Rt1 of 11 bits is output. Specifically, the digital image data of 9 bits is referred to, and prestored corrected data of 11 bits is thereby read from the first memory.

In the input image data Rc in the low gradation part, the data of the 1 most significant bit is '0'. As such, the 1 most significant bit is excluded, thereby to configure the data width of the input data to the low gradation part correction table 200 to have 9 bits in order to reduce the memory amount. According to this configuration, image quality deterioration can be restrained, and the memory size can be reduced.

As in the first embodiment, although the low-gradation-part output image data Rt1 is 11-bit data, the data represents information equivalent to information of 12 bits. In the second embodiment, whereas the low gradation part correction table 200 is configured to produce the output at a data width of 12 bits, the 1 most-significant bit of the low-gradation-part output image data Rt1 is '0'. As such, the table data width is composed of 11 bits in order to reduce the memory amount. According to this configuration, image quality deterioration can be restrained, and the memory size can be reduced.

The low-gradation-part output image data Rt1 is then input into the selector 231.

In addition, the input image data Rc of 9 bits excluding 1 most-significant bit is input into the high gradation part correction table 210. Then, correction processing is performed referring to a second correction information group so that a high-gradation-part output image data Rt2 of 10 bits is output. Specifically, the digital image data of 9 bits is referred to, and prestored data for operation of 10 bits is thereby read from the second memory. The high-gradation-part output image data Rt2 undergoes processing in the shift register 220 to produce data of 12 bits, and the data is input into the selector 231. More specifically, corrected data is calculated in the arithmetic circuit based on the read-out data for operation.

On the other hand, it is determined by the discriminating circuit 230 whether the input image data Rc is low gradation data or high gradation data. A result L_sel is input into the selector 231.

In case that the discriminating circuit 230 discriminates that the input image data Rc is the low gradation data, then low-gradation-part correction image data is output as correction image data Rv. In this event, since the low-gradation-part correction image data consists of 11 bits, '0' is added to the most significant bit, thereby to produce an output of 12 bits. On the other hand, in case that the input image data Rc is the high gradation data, then the high-gradation-part correction image data is output as correction image data Rv. More specifically, in case that the value of the input 10-bit digital image data is less than or equal to a predetermined value, then the read out corrected data is output; and in case that the value of the input 10-bit digital image data is greater than the predetermined value, then the calculated corrected data is selected and output. In the second embodiment, the predetermined value is the maximum value of the low 9 bits, excluding the most significant bit, of the input image data Rc, and the value is 511. In this manner, the output of the correction processing circuit 110 Rv is thus created and output to the data array conversion unit 9.

Figure 9A:
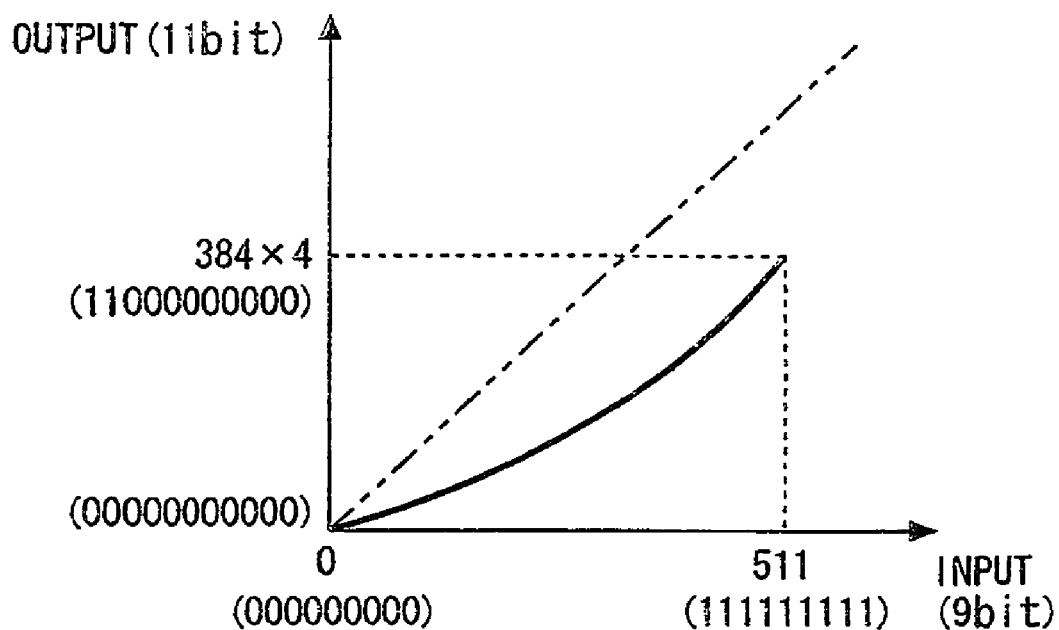
FIGS. 9A and 9B are diagrams showing a correction table mounted in the correction processing circuit according to the second embodiment of the invention.

The correction tables will now be described hereafter. As shown in FIG. 9A, correction information are prestored in the low gradation part correction table 200. The low gradation part correction table 200 contains the first correction information group for the correction of the first range (0 to 511) in the gradation range allocatable to the input image data, and 11-bit output image data is output after the correction processing.

Figure 9B:
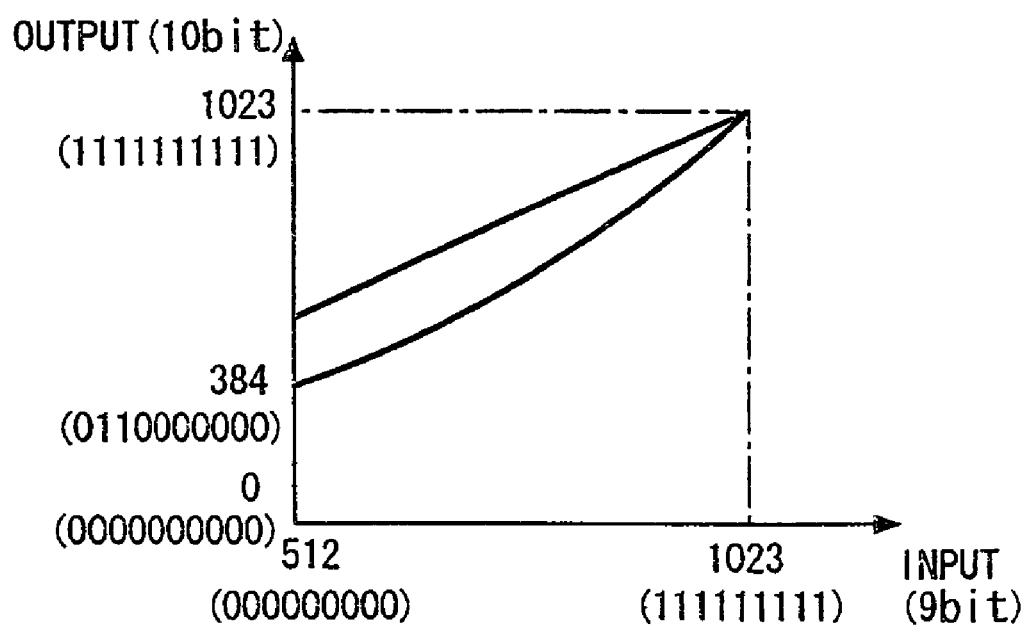

Likewise, as shown in FIG. 9B, the high gradation part correction table 210 contains the second correction information group for the correction of the second range (512 to 1023) in the gradation range allocatable to the input image data.

In the second embodiment, the data amount of the low gradation part correction table 200 is the product (5632 (bits)) of the number of items of referred digital image data (512 (items)) and the data width (11 bits) of corrected data that is to be read out from the low gradation part correction table 200.

The data amount of the high gradation part correction table 210 is the product (5120 (bits)) of the number of items of referred digital image data (512 (items)) and the data width (10 bits) of data for operation that is to be read out from the high gradation part correction table 210.

Thus, according to the second embodiment, the sum (10752 (bits)) of the data amount (5632 bits) of the corrected data stored in the first memory and the data amount (5120 bits) of the data for operation is less than the product (12288 (bits)) of $2^{10}$ and the bit width (12 bits) of selected and output corrected data.

According to this configuration, while image quality deterioration is being restrained, the scale of hardware such as memories can be reduced.

In the second embodiment, the amount of correction information in the low gradation part correction table 200 is the product (5632 (bits)) of the bit width (11 bits) and the number ($2^9$), wherein the bit width (11 bits) is the width of the data output from the correction table corresponding to one item of input data, and the number ($2^9$) is the number of items or input data inputtable into the correction table in the value of image data included in the range having the predetermined width (512 (items)).

The amount of correction information in the high gradation part correction table 210 is the product (5120 (bits)) of the bit width (10 bits) and the number ($2^9$) wherein the bit width (10 bits) is the width of the data output from the correction table corresponding to one item of input data, and the number ($2^9$) is the number of items of input data inputtable into the correction table in the value of image data included in the range having a predetermined width (512 (items)).

Thus, the second embodiment has the configuration wherein the correction tables in the correction processing circuit, respectively, include the first correction information group corresponding to the first range of the gradation range allocatable to the image data being input, and the second correction information group corresponding to the second range existing on the higher gradation side than the first range. Further, in the configuration, the amount of correction information corresponding to a range included in the second range and having the same width as a predetermined width is less than the amount of correction information corresponding to a range included in the first range and having the predetermined width.

As described above, in the low gradation part correction table 200, the amount of correction information corresponding to the range included in the first range and having the predetermined range width is not reduced, thereby to enable quantization error to be reduced.

On the other hand, in the high gradation part where the quantization error is not prominent, the amount of correction information corresponding to the range having the predetermined range width is made less than that in the low gradation part. Thereby, the correction processing circuit 110 with less quantization error can be realized without increasing the scale of hardware such as memories.

The inventors observed images displayed with the use of the configuration in accordance with the second embodiment. As a consequence, as in the first embodiment, it was verified that preferred images can be displayed while concurrently achieving preferred image quality, particularly, white balance, in the low gradation part by restraining the occurrence of quantization error in the low gradation part. In addition, it was verified that increase in the scale of hardware such as memories can be restrained. Further, it was verified that preferred images can be displayed even in the event of moving-picture display.

Third Embodiment

An image display apparatus according to a third embodiment of the invention will be described hereafter. In the display apparatus according to the third embodiment, the display apparatus is the same in configuration as the display apparatus according to the first embodiment, except for the configuration of a correction processing circuit 140, so that repeated descriptions of common portions will be omitted herefrom.

Figure 11:
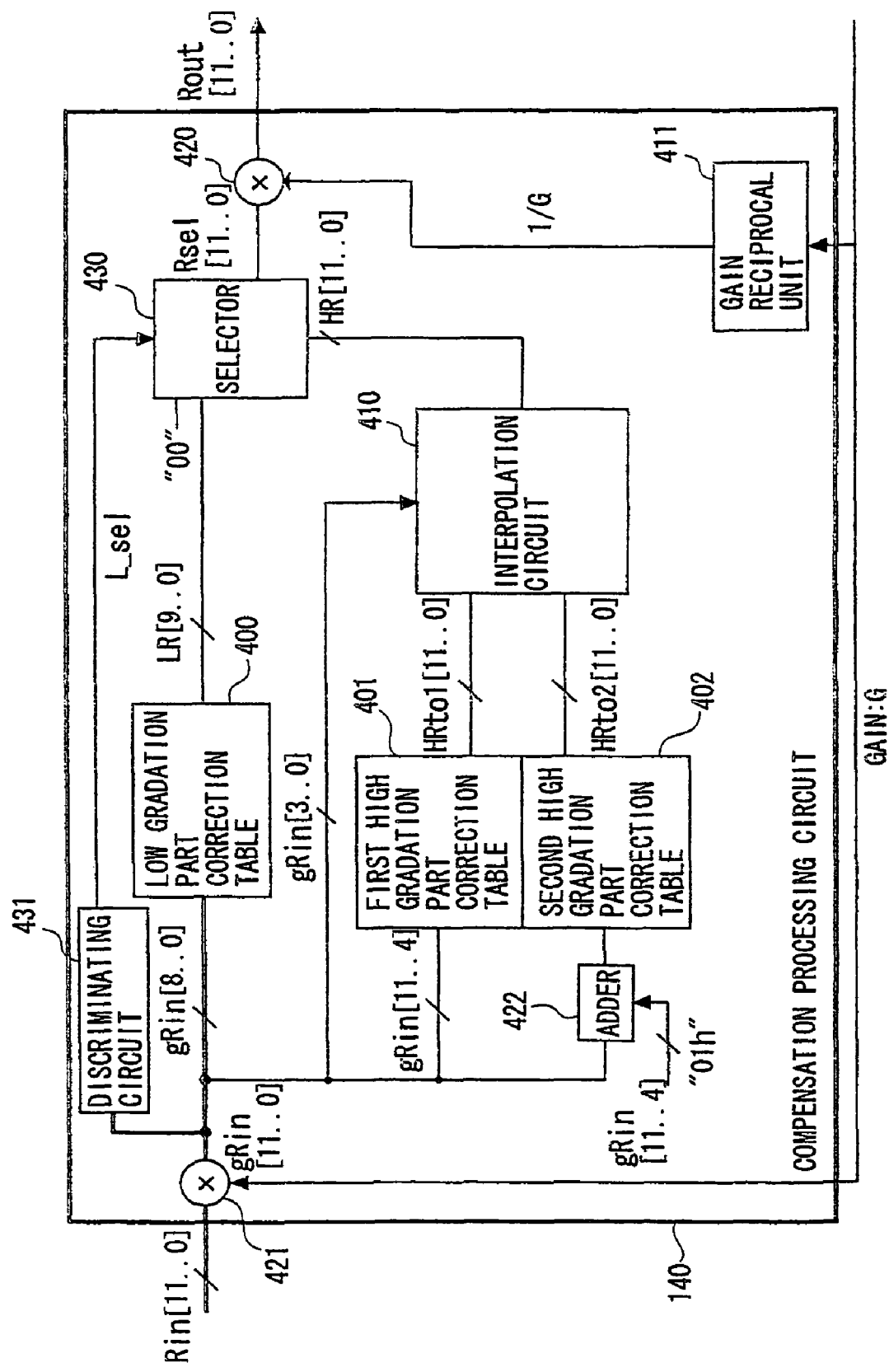
FIG. 11 is a block diagram showing an image display apparatus incorporating a correction processing circuit according to the third embodiment of the invention.

FIG. 11 shows the configuration of the correction processing circuit 140 according to the third embodiment. For simplifying description, signals only on R (red) are shown in the correction processing circuit 140 of FIG. 11.

According to the third aspect of the invention, there is provided an image processing apparatus comprising: a first memory from which prestored corrected data is read out by referring to low P bit (P is an integer number greater than or equal to 1, and less than or equal to M) in M bits digital image data (M is an integer number less than or equal to 2); a second memory from which prestored data for operation is read out by referring to high R bit (K is an integer number greater than or equal to 1, and less than or equal to M−1) in the digital image data; and an arithmetic circuit that calculates corrected data based on the data for operation read out from the second memory; and a selector circuit that outputs the read-out corrected data in case that a value of the digital image data is less than or equal to a predetermined value and that outputs the calculated corrected data in case that the value of the digital image data is greater than the predetermined value.

P may be M, but a case can occur where the data amount of corrected data stored in the memory is increased to be the same as or greater than a conventional memory data amount. In this case, the memory data amount cannot be reduced. However, image quality deterioration can be restrained, and image quality can be improved.

Also, the M bits digital image data is digital image data whose bit width are M bits.

The correction processing circuit 140 according to the third embodiment is configured to include a low gradation part correction table 400, a first high gradation part correction table 401, a second high gradation part correction table 402, an interpolation circuit 410, a gain reciprocal unit 411, multipliers 420 and 421, an adder 422, a selector 430, and a discriminating circuit 431. A first memory according to the invention is configured to include the low gradation part correction table 400, and a second memory according to the invention is configured to include the first high gradation part correction table 401 and the second high gradation part correction table 402. An arithmetic circuit according to the invention is configured of the interpolation circuit 410. A selector circuit according to the invention is configured of the selector 430. The first high gradation part correction table 401 and the second high gradation part correction table 402 may be configured as a single table.

In the third embodiment, an input signal Rin of 12 bits is input into the correction processing circuit 140. In the third embodiment, a gradation range allocatable to the input image data is divided into two ranges. In the input image data of 12 bits, 0 to 511 are allocated to the first range, and 512 to 4095 are allocated to the second range.

The following will describe signal processing by the correction processing circuit 140 according to the third embodiment. To begin with, 9 low bits in the input image data after the gain multiplication gRin of 12 bits is input into the low gradation part correction table 400. Then, in the low gradation part correction table 400, correction processing is performed referring to the first correction information group so that a low-gradation-part output image data LR of 10 bits is output. Specifically, the 9 low bits in the digital image data of 12 bits are referred to, and prestored corrected data of 10 bits is thereby read out from the first memory. In input image data gRin in the low gradation part, the data of the 3 most-significant bits has the value of '000'. As such, the 3 most-significant bits are excluded, thereby to configure the data width of the input data to the low gradation part correction table 400 to have 9 bits in order to reduce the memory amount. According to this configuration, image quality deterioration can be restrained, and the memory size can be reduced.

Similarly as in the first embodiment, although the low-gradation-part output image data LR is 10-bit data, the data represents information equivalent to information of 12 bits. In the third embodiment, whereas the low gradation part correction table 400 is configured to produce the output at a data width of 12 bits, 2 most-significant bits of the low-gradation-part output image data LR are '00'. As such, the 2 most-significant bits are excluded, thereby to configure the table data width to have 10 bits in order to reduce the memory amount. According to this configuration, image quality deterioration can be restrained, and the memory size can be reduced.

Then the low-gradation-part output image data LR is input into the selector 430.

Subsequently, 8 high bits in the input image data after the gain multiplication grin of 12 bits is input into the first high gradation part correction table 401. Then, correction processing of the input image data gRin is performed referring to the second correction information group so that a first high-gradation-part output image data HRto1 of 12 bits is output.

Further, a signal in which 1 is added by the adder 422 to the input 8 high bits in image data after the gain multiplication gRin of 12 bits is input into the second high gradation part correction table 402. Then, correction processing of the input image data gRin is performed referring to the second correction information group so that a second high-gradation-part output image data HR to 2 of 12 bits is output.

That is, the 8 high bits in the digital image data of 12 bits is referred to, and prestored data for operation is thereby read out from the second memory.

The second range in the image data to be input into the first high gradation part correction table 401 and the second high gradation part correction table 402 is the range of 32 to 255. In this case, however, due to the circuit configuration, the first high gradation part correction table 401 and the second high gradation part correction table 402 have the second correction information group corresponding to the range of 0 to 255.

Linear interpolation is then performed by inputting the correction-processed image data HR to 1 and HR to 2 and the 4 low bits in the input image data after the gain multiplication gRin into the interpolation circuit 410, thereby to output a high-gradation-part correction image data HR of 12 bits. That is, corrected data is calculated by the arithmetic circuit based on the read-out data for operation.

Then the high-gradation-part correction image data HR is input into the selector 430.

In addition, it is determined by the discriminating circuit 431 whether the input image data after the gain multiplication gRin is low gradation data or high gradation data. A result L_sel is input into the selector 430.

In the selector 430, in case that the input image data after the gain multiplication gRin is the low gradation data, then the low-gradation-part correction image data is output as correction image data Rcel. In this event, since the low-gradation-part correction image data is composed of 10 bits, '00' are added to the most significant bit, thereby to produce an output of 12 bits. On the other hand, in case that the input image data after the gain multiplication gRin is the high gradation data, then the high-gradation-part correction image data is output as corrected image data Rcel. More specifically, in case that the value of the input 12-bit digital image data is less than or equal to a predetermined value, then the read-out corrected data is output; and in case that the value of the input 12-bit digital image data is greater than the predetermined value, then the calculated corrected data is output. In the third embodiment, the predetermined value is 511. In this connection, the predetermined value may be the maximum value of the referred digital image data in the low gradation part correction table 400, thereby to enable the configuration of the correction processing circuit 140 to be more simplified. Particularly, in regard to the data width of the referred digital image data in the low gradation part correction table 400, the configuration is preferably such that at least reference is not made to 1 high bit or more of the data width of input digital image data. This configuration can be made such that at least the most significant bit of input digital image data is always '0'. Thereby, the memory size can be even more reduced.

In addition, the predetermined value is preferably the maximum value of referred digital image data. Thereby, the configuration for the selection can be further simplified.

Then, in the multiplier 420, correction image data Rsel is multiplied by a reciprocal I/G of the gain G calculated by the gain reciprocal unit 411, whereby an output signal Rout of the correction processing circuit 140 is output. Similarly as in the first embodiment, the output signal Rout is supplied to the voltage drop correction processing circuit 11.

In the present embodiment, the correction image data output from the selector 430 is multiplied by the reciprocal of the gain. However, the configuration may be such that the corrected data read out from the low gradation part correction table and interpolation-processed the data for operation read out from the high gradation part correction table are multiplied by the reciprocal of the gain. Specifically, the configuration is made such that data is calculated by the first arithmetic circuit based on the corrected data readout from the first memory, and data is calculated by the second arithmetic circuit based on the corrected data read out from the second memory.

Figure 12:
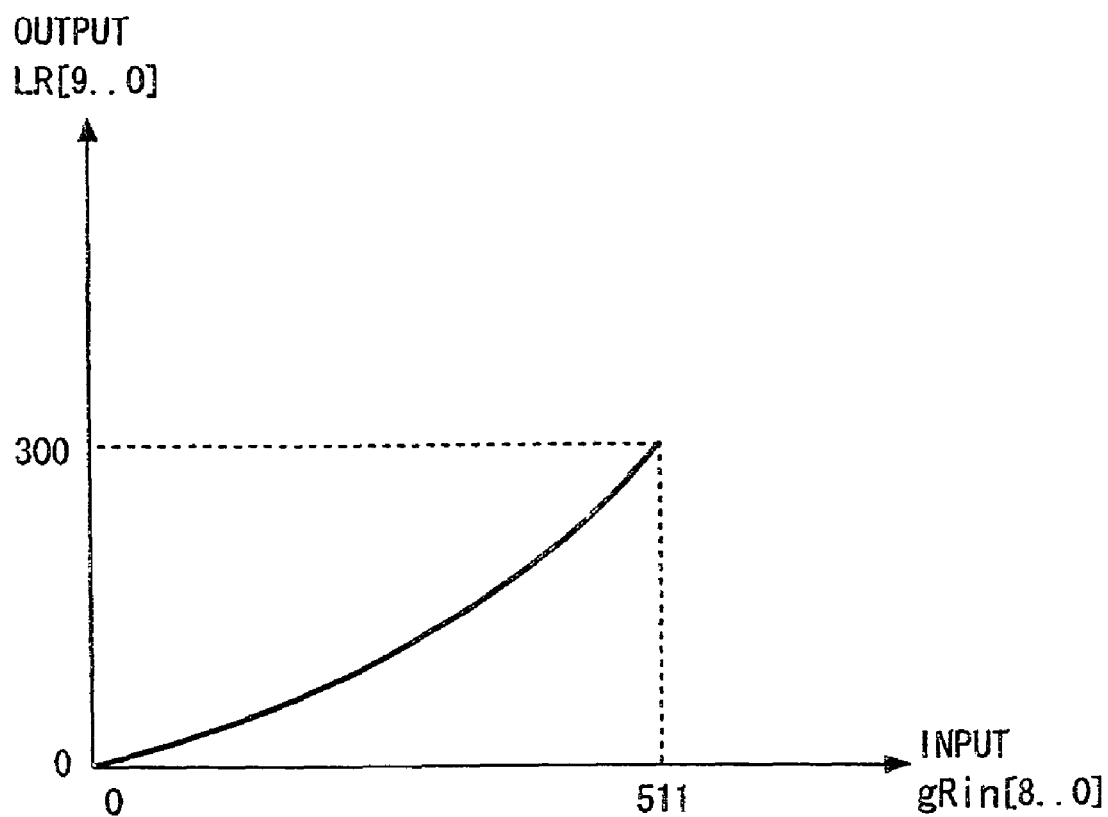
FIG. 12 is a diagram showing a low gradation part correction table mounted in the correction processing circuit according to the third embodiment of the invention.

The correction tables will be described hereafter. FIG. 12 shows correction information regarding correction tables contained in the low gradation part correction table 400. The low gradation part correction table 400 incorporates the correction information regarding the correction tables shown in FIG. 12. The low gradation part correction table 400 contains the first correction information group for the correction of the first range (0 to 511) of the gradation range allocatable to the input image data, and 10-bit output image data is output after the correction processing.

Figure 13:
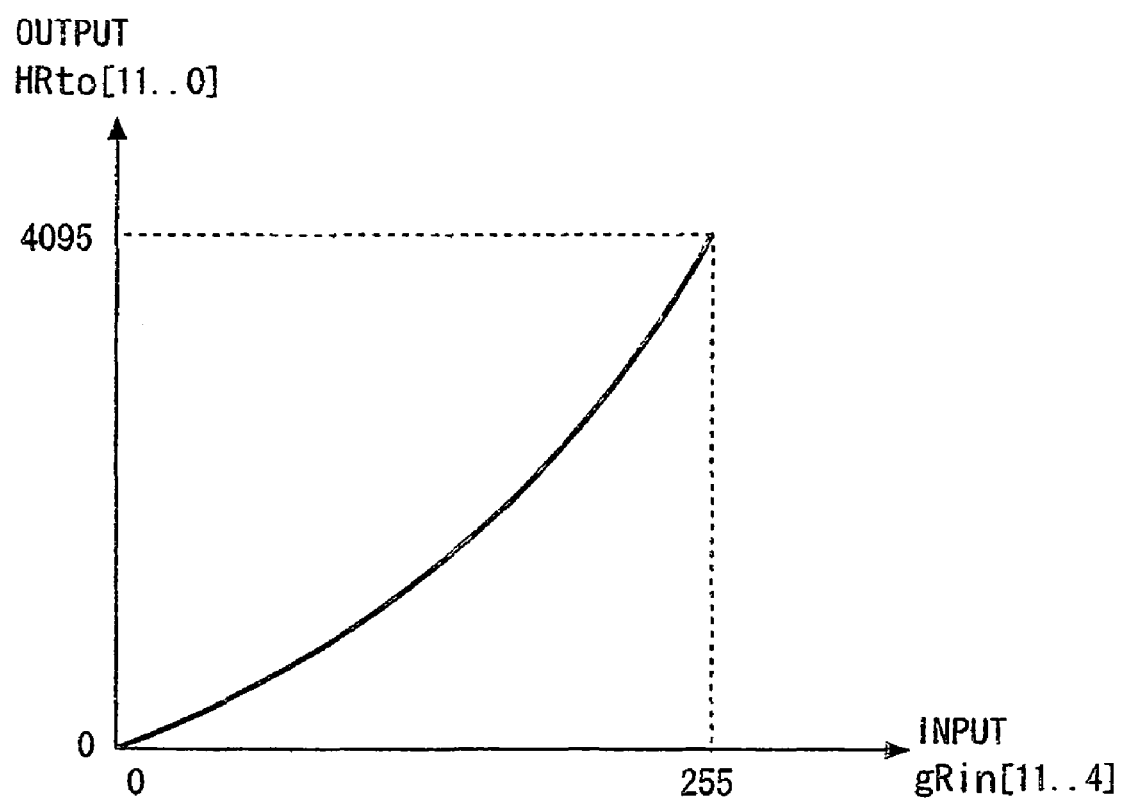
FIG. 13 is a diagram showing a high gradation part correction table mounted in the correction processing circuit according to the third embodiment of the invention.

Likewise, the first high gradation part correction table 401 and the second high gradation part correction table 402 each contains correction information regarding the correction tables shown in FIG. 13. The first high gradation part correction table 401 and the second high gradation part correction table 402 each contain the second correction information group for the correction of the second range in the gradation range allocatable to the input image data.

In the third embodiment, the data amount of the low gradation part correction table 400 is the product (5120 (bits)) of the number of items of referred digital image data (512 (items)) and the data width (10 bits) of corrected data that is to be read out from the low gradation part correction table 400.

The data amount of the first high gradation part correction table 401 is the product (3072 (bits)) of the number of items of referred digital image data (256 (items)) and the data width (12 bits) of data for operation that is to be read out from the first high gradation part correction table 401. The data amount of the second high gradation part correction table 402 is the same as that of the first high gradation part correction table 401. Accordingly, the data amount of the data for operation is the sum (6144 (bits)) of the data amounts of the individual first high gradation part correction table 401 and second high gradation part correction table 402.

Thus, according to the third embodiment, the sum (11264 (bits)) of the data amount (5120 bits) of the corrected data stored in the first memory and the data amount (6144 bits) of the data for operation stored in the second memory is less than the product (12288 (bits)) of $2^{10}$ and the bit width (12 bits) of selected and output corrected data.

According to this configuration, while image quality deterioration is being restrained, the scale of hardware such as memories can be reduced.

The amount of correction information in the low gradation part correction table 400 is the product of the data width (10 bits) and the number ($2^9$), wherein the data width (10 bits) is the width of the data output from the correction table corresponding to one item of input data, and the number ($2^9$) is the number of items of input data inputtable into the correction table in the value of image data included in the range having the predetermined width (512 bits).

The predetermined width (512 bits) in the low gradation part correction table 400 is equivalent to one eighth of the range allocatable to the input image data. Accordingly, the same predetermined width of the high gradation part correction table as the predetermined width in the low gradation part correction table is 32 (bits), which is equivalent to one eighth of the range (256) allocatable to the 8-bit input image data.

Accordingly, the amount of correction information of the first high gradation part correction table 401 or the second high gradation part correction table 402 is the product (320 (bits)) of the data width (10 bits) and the number ($2^5$), wherein the data width (10 bits) is the width of the data output from the correction table corresponding to one item of input data, and the number ($2^5$) is the number of items of input data inputtable into the correction table in the value of image data included in the range having the predetermined width (32 bits).

Thus, according to the third embodiment, the correction tables in the correction processing circuit include the first correction information group corresponding to the first range of the gradation range allocatable to the image data being input, and the second correction information group corresponding to the second range existing on the higher gradation side than the first range. Further, in the configuration, the amount of correction information corresponding to a range included in the second range and having the same width as the predetermined width is less than the amount of correction information corresponding to a range included in the first range and having the predetermined width.

As described above, in the low gradation part correction table 400, the correction information corresponding to the range included in the first range and having the predetermined width is not reduced, thereby to enable quantization error to be reduced.

On the other hand, in the high gradation part where the quantization error is not prominent, correction image data are provided corresponding to constant intervals with respect to the predetermined width, and inter-data correction image data are calculated by interpolation calculation, thereby to reduce the amount of memory use. Thereby, the correction processing circuit with less quantization error can be realized without increasing the scale of hardware such as memories.

Using the above-described configuration according to the third embodiment, the inventors observed images displayed with the correction processing circuit 140 being mounted. As a consequence, as in the first embodiment, it was verified that preferred images can be displayed while concurrently achieving preferred image quality, particularly, white balance, by restraining the occurrence of quantization error in the low gradation part. In addition, it was verified that increase in the scale of hardware such as memories can be restrained. Further, it was verified that preferred images can be displayed even in the event of moving-picture display.

As described above, according to the third embodiment, the correction of the input signal in the high gradation part is performed using the two correction tables, namely, the first and second high gradation part correction tables 401 and 402. However, the high-gradation-side correction may be performed at the double speed, using a single high gradation part correction table.

Figure 14:
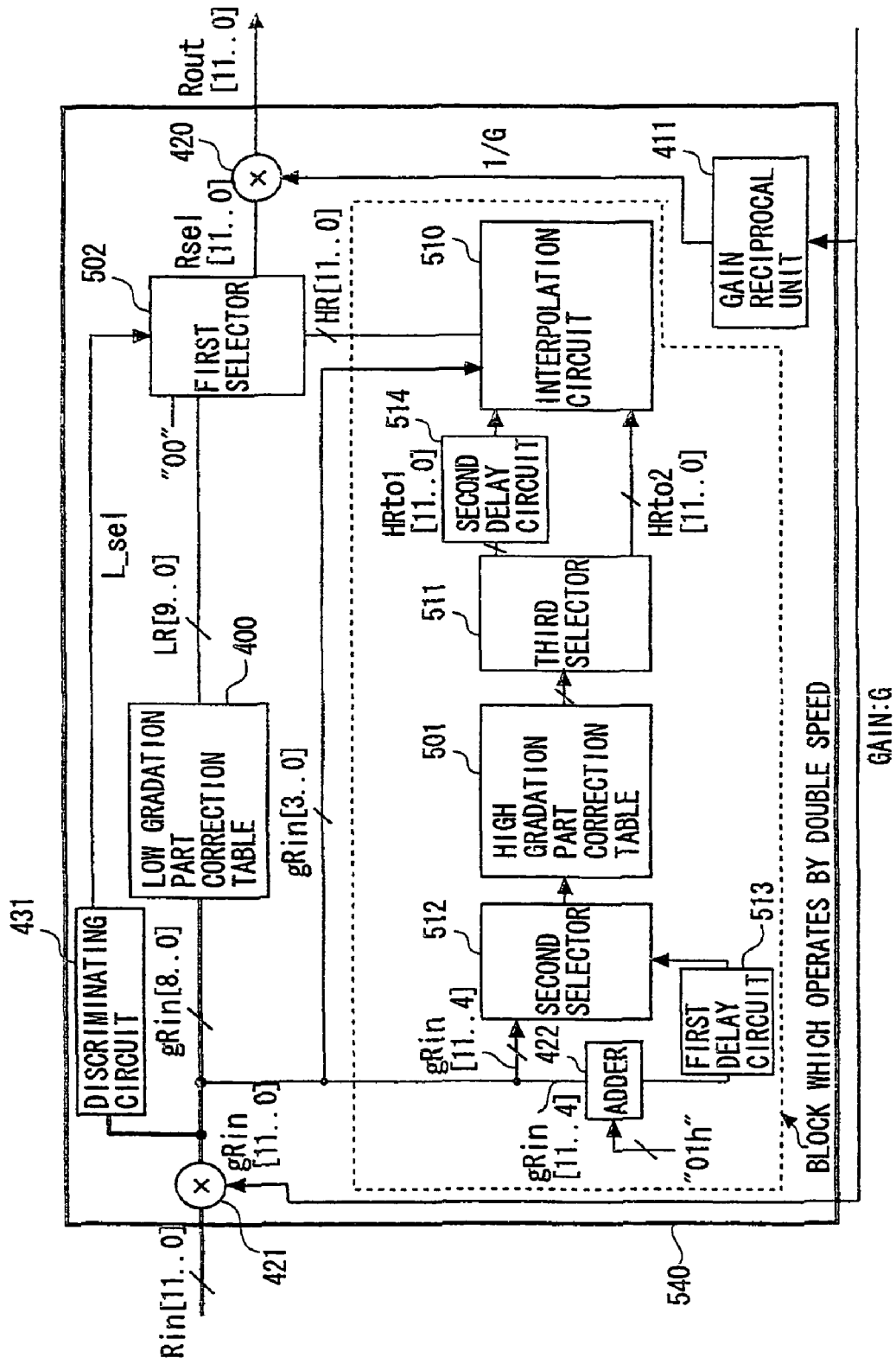
FIG. 14 is a block diagram showing an image display apparatus incorporating a correction processing circuit according to a fourth embodiment of the invention.

FIG. 14 shows an example configuration that performs linear interpolation by using a single high gradation part correction table. Referring to the drawing, 501 denotes a high gradation part correction table, 502 denotes a first selector, 510 denotes an interpolation circuit, 511 denotes a third selector, 512 denotes a second selector, 513 denotes a first delay circuit, and 514 denotes a second delay circuit.

The following describes correction of the high gradation side of the correction processing circuit having the configuration shown in FIG. 14.

To begin with, a signal being input to the side of the high gradation part correction table 501 is sampled at a speed double that for a signal being input to the low gradation part correction table.

Then a signal of 8 high bits in the input image data after the gain multiplication grin is input into the high gradation part correction table 501. Further, a signal formed by adding 1 to the signal of the 8 high bits is input into the high gradation part correction table 501 with a time delay by using the second selector 512.

In the high gradation part correction table 501, the second correction information group is referred to, whereby the correction processing is performed so that image data of 12 bits is output. Then, using the third selector 511, the image data output earlier is delayed by using the second delay circuit 514 and input into the interpolation circuit 510, whereas the image data output later is input into the interpolation circuit 510 without delay.

Then, the input signals together with the 4 low bits of the input image data after the gain multiplication gRin undergo interpolation calculation. In this configuration, correction image data HR can be calculated similarly as in the configuration shown in FIG. 11.

In the configuration of FIG. 14, the block surrounded by a broken line is operated at a speed double an operation speed of the low gradation part.

Fourth Embodiment

An example of a television apparatus using the image display apparatus described above will be described herebelow. FIG. 10 shows a television apparatus according to a fourth embodiment.

With reference to FIG. 10, the television apparatus according to the fourth embodiment is configured to include an image information receiving apparatus 301, an image signal generating circuit 302, and the image display apparatus 303 applying the invention.

First, image information received by the image information receiving apparatus 301 by tuning in image information is supplied to the image signal generating circuit 302, whereby an image signal is generated. Examples of the image information receiving apparatus 301 include a receiver such as tuner capable of selecting and receiving video broadcasts in image information through, for example, radio broadcasting, wire broadcasting, and the Internet.

A TV unit can be configured by connecting an audio device or the like to the image information receiving apparatus 301 and by incorporating the image signal generating circuit 302 and the image display apparatus 303.

In the image signal generating circuit 302, image signals corresponding to each pixel of the image display apparatus 303 are generated from the video image information, and are supplied to the image display apparatus 303. Images in accordance with the input image signals are displayed on the image display apparatus 303.

As above, whereas the embodiments are described in detail, the invention is not limited to the above-described embodiments, but various alterations and modifications may be made based on the technical ideas of the invention. For example, the numeric values given in the embodiments are merely examples, and numeric values different from them may be used.

In the respective embodiment, although the circuit for correcting the phosphor saturation characteristics is employed as the correction processing circuit 10, 110, and 140, the circuit is not limited thereto. For example, a gamma correction circuit may instead be employed therefor.

Further, in the configuration of the respective embodiment, the low gradation part correction table has the first correction information group, and the high gradation part correction table has the second correction information group. However, the configuration may be such that a single correction table has the first correction information group and the second correction information group. That is, the first and second memories may be configured into a single memory.

This application claims priority from Japanese Patent Application No. 2004-194270 filed Jun. 30, 2004, Japanese Patent Application No. 2005-039993 filed Feb. 17, 2005 and Japanese Patent Application No. 2005-180493 filed Jun. 21, 2005, which are hereby incorporated by reference herein.

What is claimed is:

1. An image processing apparatus comprising:
a first memory from which prestored corrected data is read out by referring to low P bit (P is an integer number greater than or equal to 1, and less than or equal to M) in M bits digital image data (M is an integer number less than or equal to 2);
a second memory from which prestored data for operation is read out by referring to high R bit (R is an integer number greater than or equal to 1, and less than or equal to M−1) in the digital image data;
an arithmetic circuit that calculates corrected data based on the data for operation read out from the second memory; and
a selector circuit that outputs the read-out corrected data in case that a value of the digital image data is less than or equal to a predetermined value and that outputs the calculated corrected data in case that the value of the digital image data is greater than the predetermined value.

2. An image processing apparatus according to claim 1, wherein in the low P bit in the digital image data, P is less than or equal to M−1.

3. An image processing apparatus according to claim 2, wherein the predetermined value is a maximum value of the low P bit in the digital image data.

4. An image processing apparatus according to claim 1, wherein a sum of a data amount of the corrected data stored in the first memory and a data amount of the data for operation stored in the second memory is less than a product of $2^M$ and a bit width of the output corrected data.

5. An image display apparatus comprising:
the image processing apparatus according to claim 1; and
a display device for displaying an image on the basis of the corrected data output by the image processing apparatus.

6. A television apparatus comprising:
an image display apparatus according to claim 5;
a circuit configured to receive an image signal by selecting image information; and
a circuit for applying a voltage to the image display apparatus for displaying an image on the basis of the image signal.

7. An image processing apparatus comprising:
a first memory from which prestored corrected data is read out by referring to low P bit (P is an integer number greater than or equal to 1, and less than or equal to M) in M bits digital image data (M is an integer number greater than or equal to 2);
a first arithmetic circuit that calculates data based on the corrected data read out from the first memory;
a second memory from which prestored data for operation is read out by referring to high R bit (R is an integer number greater than or equal to 1, and less than or equal to M−1) in the digital image data;
a second arithmetic circuit that calculates data based on the data for operation read out from the second memory; and
a selector circuit that outputs the data calculated by the first arithmetic circuit in case that a value of the digital image data is less than or equal to a predetermined value and that outputs the data calculated by the second arithmetic circuit in case that the value of the digital image data is greater than the predetermined value.

8. An image processing apparatus comprising:
a first memory from which prestored T bits corrected data (T is an integer number greater than or equal to 2) is read out by referring to digital image data;

a second memory from which prestored U bit data for operation (U is an integer number greater than or equal to 1, and less than or equal to T−1) is read out by referring to the digital image data;

an arithmetic circuit that calculates corrected data based on the data for operation read out from the second memory; and a selecting circuit that outputs the read-out corrected data in case that a value of the digital image data is less than or equal to a predetermined value and that outputs the calculated corrected data in case that the value of the digital image data is greater than the predetermined value.

9. An image processing apparatus comprising:

a first memory from which prestored T bits corrected data (T is an integer number greater than or equal to 2) is read out by referring to digital image data;

a first arithmetic circuit that calculates data based on the corrected data read out from the first memory;

a second memory from which prestored U bit data for operation (U is an integer number greater than or equal to 1, and less than or equal to T−1) is read out by referring to the digital image data;

a second arithmetic circuit that calculates data based on the data for operation read out from the second memory; and a selector circuit that outputs the data calculated by the first arithmetic circuit in case that a value of the digital image data is less than or equal to a predetermined value and that outputs the data calculated by the second arithmetic circuit in case that the value of the digital image data is greater than the predetermined value.

* * * * *